(12) United States Patent  (10) Patent No.: US 7,777,928 B2
Moore                    (45) Date of Patent:     Aug. 17, 2010

(54) ELECTRODE ENHANCEMENTS FOR FIBER-BASED DISPLAYS

(76) Inventor: Chad Byron Moore, 7 W. 4$^{th}$ St., Corning, NY (US) 14830

( * ) Notice: Subject to any disclaimer, the term of this patent is extended or adjusted under 35 U.S.C. 154(b) by 882 days.

(21) Appl. No.: 11/236,904

(22) Filed: Sep. 28, 2005

(65) Prior Publication Data

US 2006/0193031 A1    Aug. 31, 2006

Related U.S. Application Data

(60) Provisional application No. 60/657,123, filed on Feb. 28, 2005.

(51) Int. Cl.
    G02F 1/03     (2006.01)
    G02F 1/035    (2006.01)
(52) U.S. Cl. .......................................... 359/245; 385/2
(58) Field of Classification Search ................ 359/245, 359/246, 248, 254; 313/582, 113, 583, 586, 313/584; 385/2, 8, 31, 33, 40, 901
    See application file for complete search history.

(56) References Cited

U.S. PATENT DOCUMENTS

| 3,767,392 | A | 10/1973 | Ota |
| 3,964,050 | A | 6/1976 | Mayar |
| 4,126,854 | A | 11/1978 | Sheridon |
| 4,896,149 | A | 1/1990 | Buzak et al. |
| 5,633,494 | A * | 5/1997 | Danisch .................. 250/227.16 |
| 5,739,801 | A | 4/1998 | Sheridon |
| 5,961,804 | A | 10/1999 | Jacobson et al. |
| 5,984,747 | A | 11/1999 | Bhagavatula et al. |
| 5,985,700 | A | 11/1999 | Moore |
| 6,014,188 | A * | 1/2000 | Yamada et al. ................. 349/32 |
| 6,111,191 | A | 8/2000 | Hall et al. |
| 6,171,762 | B1 | 1/2001 | Borrelli et al. |
| 6,197,429 | B1 | 3/2001 | Lapp et al. |
| 6,247,987 | B1 * | 6/2001 | Moore .......................... 445/24 |
| 6,354,899 | B1 | 3/2002 | Moore |
| 6,414,433 | B1 | 7/2002 | Moore |
| 6,431,935 | B1 | 8/2002 | Moore |
| 6,452,332 | B1 | 9/2002 | Moore |
| 6,459,200 | B1 * | 10/2002 | Moore .......................... 313/582 |
| 6,507,146 | B2 | 1/2003 | Moore |
| 6,524,773 | B1 | 2/2003 | Borrelli et al. |
| 6,570,339 | B1 | 5/2003 | Moore |
| 6,607,994 | B2 * | 8/2003 | Soane et al. ................... 442/59 |
| 6,611,100 | B1 | 8/2003 | Moore |
| 6,750,605 | B2 | 6/2004 | Moore |
| 6,771,234 | B2 * | 8/2004 | Moore .......................... 345/60 |

(Continued)

Primary Examiner—Hung X. Dang
Assistant Examiner—Tuyen Q Tra
(74) Attorney, Agent, or Firm—Brown & Michaels, PC

(57) ABSTRACT

A method of creating very large flat panel displays uses fiber and tubes containing wire electrodes to create the structure in a panel. However, there are several display types, especially those involving an electro-optic material like a liquid crystal, which require the electric field to be spread across the entire surface of the pixel or fiber. A method disclosed herein uses a conductive layer to spread the voltage applied to the wire electrodes in the fiber across the surface of the fiber. The conductive layer may be capacitively or resistively coupled to the wire electrode. In most display applications, a transparent conductive layer is required. The easiest and most cost effective methods to fabricate a transparent conductive layer use a transparent conductive polymer or carbon nanotubes.

34 Claims, 27 Drawing Sheets

U.S. PATENT DOCUMENTS

| | | | |
|---|---|---|---|
| 6,811,895 B2 * | 11/2004 | Murasko et al. | 428/690 |
| 6,833,192 B1 * | 12/2004 | Caruso et al. | 428/403 |
| 6,913,713 B2 * | 7/2005 | Chittibabu et al. | 252/501.1 |
| 6,917,156 B2 | 7/2005 | Moore | |
| 6,946,803 B2 | 9/2005 | Moore | |
| 7,034,446 B2 | 4/2006 | Moore | |
| 7,082,236 B1 * | 7/2006 | Moore | 385/33 |
| 7,321,714 B2 * | 1/2008 | Ingman et al. | 385/147 |
| 2001/0009352 A1 | 7/2001 | Moore | |
| 2001/0033483 A1 | 10/2001 | Moore | |
| 2002/0140133 A1 | 10/2002 | Moore | |
| 2002/0149717 A1 | 10/2002 | Borrelli et al. | |
| 2003/0189402 A1 * | 10/2003 | Gaudiana et al. | 313/507 |
| 2005/0001528 A1 * | 1/2005 | Mao et al. | 313/309 |
| 2006/0214880 A1 | 9/2006 | Moore | |
| 2007/0278925 A1 * | 12/2007 | Mao et al. | 313/311 |

* cited by examiner

US 7,777,928 B2

ELECTRODE ENHANCEMENTS FOR FIBER-BASED DISPLAYS

REFERENCE TO RELATED APPLICATIONS

This application claims an invention which was disclosed in Provisional Application No. 60/657,123, filed Feb. 28, 2005, entitled "ELECTRODE ENHANCEMENTS FOR FIBER-BASED DISPLAYS". The benefit under 35 USC §119(e) of the U.S. provisional application is hereby claimed, and the aforementioned application is hereby incorporated herein by reference.

FIELD OF THE INVENTION

The invention pertains to the field of fiber-based displays and methods of manufacture. More particularly, the invention pertains to adding conductive films and layers to the fibers to spread the voltage across a surface of the fiber to assist in addressing an electro-optic material.

BACKGROUND OF THE INVENTION

There are several different methods of producing electronic reflective and transmissive displays. The most well known and widely used method is to use liquid crystal molecules as the electro-optic material. In the liquid crystal family, a vast range of molecules could potentially be used to create the electro-optic modulated material. Some of these liquid crystal molecules include, twisted nematic, cholesteric-nematic, dichroic dye (or guest-host), dynamic scattering mode, and polymer dispersed to name a few. Most of these liquid crystal molecules require other films, such as, alignment layers, polarizers, and reflective films.

Another type of reflective display composing an electro-optic material is an electrophoretic display. Early work such as that described in U.S. Pat. No. 3,767,392, "Electrophoretic Light Image Reproduction Process", used a suspension of small charged particles in a liquid solution. The suspension is sandwiched between two glass plates with electrodes on the glass plates. If the particles have the same density as the liquid solution then they are not affected by gravity, therefore the only way to move the particles is using an electric field. By applying a potential to the electrodes, the charged particles are forced to move in the suspension to one of the contacts. The opposite charge moves the particles to the other contact. Once the particles are moved to one of the contacts, they reside at that point until they are moved by another electric field, therefore the particles are bistable. The electrophoretic suspension is designed such that the particles are a different color than the liquid solution. Therefore, moving the particles from one surface to the other changes the color of the display. One potential problem with this display is the agglomeration of the small charged particles when the display is erased, i.e., as the pixel is erased, the particles are removed from the contact in groups rather than individually. Microencapsulating the electrophoretic suspension in small spheres solves this problem, as shown in U.S. Pat. No. 5,961,804, "Microencapsulated Electrophoretic Display." FIG. 1 shows the typical operation of a microencapsulated electrophoretic display. In this display the particles are positively charged and are attracted to the negative terminal of the display. The charged particles are white and the liquid solution they are suspended in is dark, therefore contrast in the display is optionally achieved by selectively moving some of the particles from one contact to the other. In this type of display, the electro-optic material 37 is the electrophoretic material and any casing used to contain the electrophoretic material.

A similar type of electro-optic display, a twisting ball display or Gyricon display, is described in U.S. Pat. No. 4,126,854, "Twisting Ball Display." It was initially called a twisting ball display because it is composed of small spheres, one side coated black, the other white, sandwiched between two electroded 5 glass plates. Upon applying an electric field, the spheres with a positive charged white half and relative negative charged black half are optionally addressed (rotated), as shown in FIG. 2. Once the particles are rotated, they stay in that position until an opposite field is applied. This bistable operation requires no electrical power to maintain an image. Another patent, U.S. Pat. No. 5,739,801, disclosed a multi-threshold addressable twisting ball display. In this type of display, the electro-optic material 37 is the bichromal spheres and any medium they may reside in to lower their friction in order to rotate.

Most electro-optic displays have problems addressing the display. Since most of the electro-optic materials do not have a voltage threshold, displays fabricated with the materials have to be individually addressed. Some of the liquid crystal materials use an active transistor back plane to address the displays, but these type of displays are presently limited in size due to the complicated manufacturing process. Transmissive displays using liquid crystal materials and a plasma addressed back plane have been demonstrated, for example in U.S. Pat. No. 4,896,149, as shown in FIG. 3. Displays fabricated using the plasma addressed back plane, shown in FIG. 3, are limited in size due to availability of the thin microsheet 33. One potential solution for producing large size displays is to use tubes 27 to create the plasma cells 35, as shown in FIG. 4. Using tubes 27 to create a plasma cell 35 was first disclosed in U.S. Pat. No. 3,964,050, and using fibers 17 with wire electrodes 31 to create the column driving plane in a transmissive plasma addressed liquid crystal display was disclosed in U.S. Pat. No. 5,984,747.

The inventor of the present invention has patents and applications directed to fiber-based displays, including U.S. Pat. No. 6,414,433 entitled "PLASMA DISPLAYS CONTAINING FIBERS", U.S. Pat. No. 6,771,234 entitled "MEDIUM AND LARGE PIXEL MULTIPLE STRAND ARRAY STRUCTURE PLASMA DISPLAY", U.S. Pat. No. 6,459,200 entitled "REFLECTIVE ELECTRO-OPTIC FIBER-BASED DISPLAYS", U.S. Pat. No. 6,611,100 entitled "REFLECTIVE ELECTRO-OPTIC FIBER-BASED DISPLAYS WITH BARRIERS", U.S. Pat. No. 6,507,146, entitled "FIBER-BASED FIELD EMISSION DISPLAY", issued Jan. 14, 2003, U.S. Pat. No. 6,452,332 entitled "FIBER-BASED PLASMA ADDRESSED LIQUID CRYSTAL DISPLAY" and U.S. patent application Ser. No. 09/517,353, entitled "FIBER-BASED DISPLAYS CONTAINING LENSES AND METHODS OF MAKING SAME", filed Mar. 2, 2000. The aforementioned patents and applications are hereby incorporated herein by reference.

There is a need in the art for a display with a conductive surface layer connected to a wire within a fiber.

SUMMARY OF THE INVENTION

The invention includes coating the surface of a fiber containing a wire electrode with a conductive coating to spread the charge across the surface of the fiber. The conductive coating may be capacitive coupled to the wire electrode or electrically (resistively) connected to the wire electrode. The conductive coated fibers containing a wire electrode are used to construct a fiber-based display where an image is formed by modulating an electro-optic material within the display. The electro-optic material is preferably selected from, but not limited to, a liquid crystal material, an electrophoretic material, a bichromal sphere material, and electrochromic material or any electro-optic material that can be modulated in an electric or electrostatic field. The electro-optic material may be passively addressed using two orthogonal arrays of conductive coated fibers containing wire electrodes. An active addressing scheme may be optionally used by replacing one of the fiber arrays with an array of plasma tubes. The conductive coating on the fibers is preferably transparent if in the optical light path. The transparent conductive coating may be formed using a carbon nanotube solution and may be coated during the fiber draw process or extruded directly into the final fiber shape.

Another embodiment of the invention uses black absorbing sides on the top fiber to act as a visor and block the light from the sun. Using black absorbing sides on the fibers blocks most of the direct sunlight and allows the production of large outdoor color video plasma and FED displays.

BRIEF DESCRIPTION OF THE DRAWINGS

FIG. 22b schematically shows a cross-section of a fiber created from drawing the preform shown in FIG. 22a.

FIG. 27b schematically shows a cross-section of a fiber that forms the top array in the display in FIG. 27a.

FIG. 27c schematically shows a cross-section of a fiber that forms the second and fourth arrays in the display in FIG. 27a.

FIG. 27d schematically shows a cross-section of a fiber that forms the third array in the display in FIG. 27a.

FIG. 27e schematically shows a cross-section of a fiber that forms the fifth array in the display in FIG. 27a.

DESCRIPTION OF THE PREFERRED EMBODIMENT

In the present invention, a conductive material or wire electrode is preferably contained within the structure of a fiber and a conductive coating is connected to the wire electrode and is brought out through the fiber and across its surface. Several fibers are arrayed together to form a sheet of fibers that forms part of the structure in a panel that is used in an electronic display.

Figure 1:
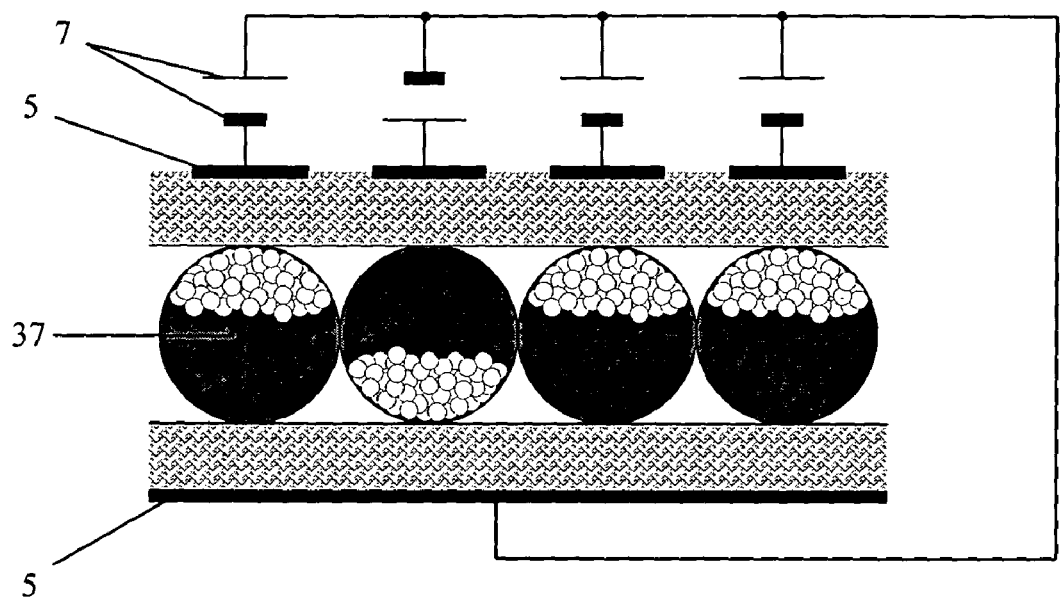
FIG. 1 schematically shows a cross-section and addressing of an electrophoretic display, in accordance with the prior art.
Figure 2:
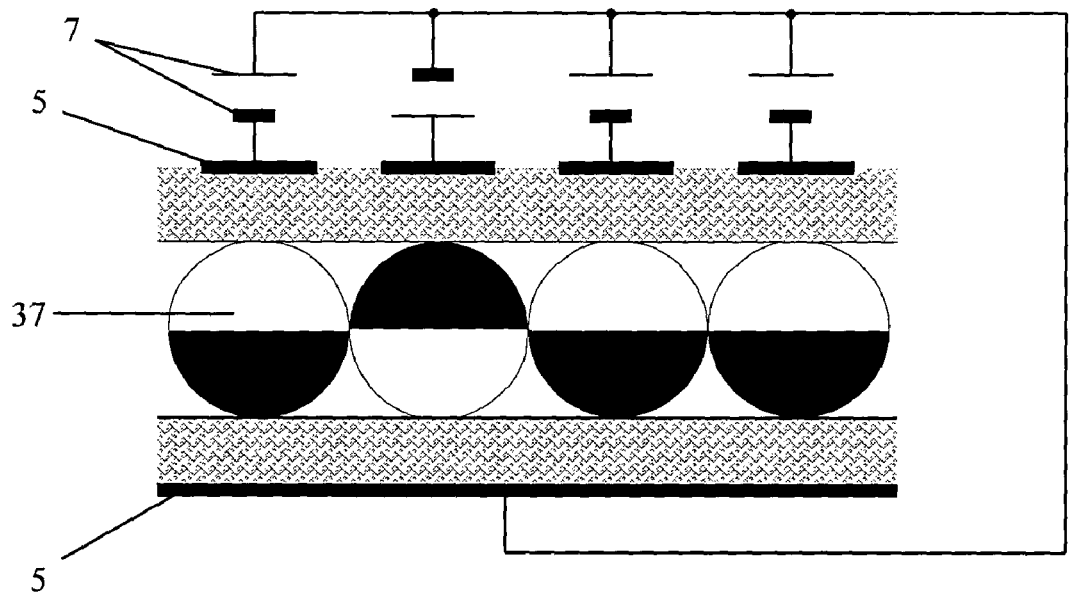
FIG. 2 schematically shows a cross-section and addressing of a bichromal sphere display in accordance with the prior art.
Figure 3:
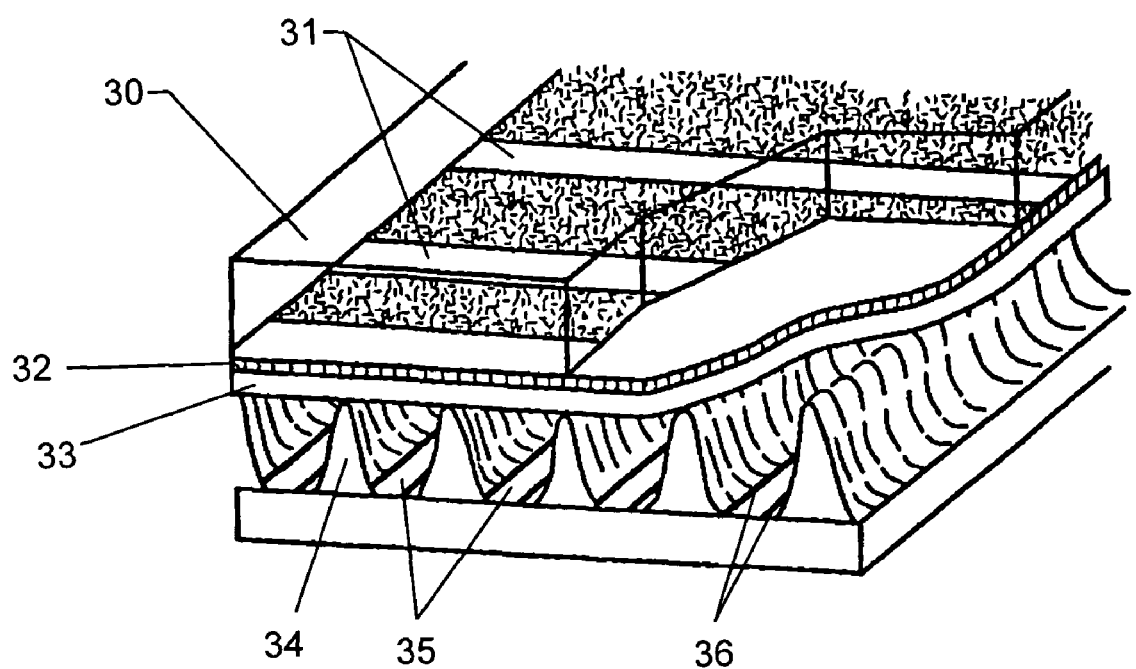
FIG. 3 illustrates a traditional PALC display in accordance with the prior art.
Figure 4:
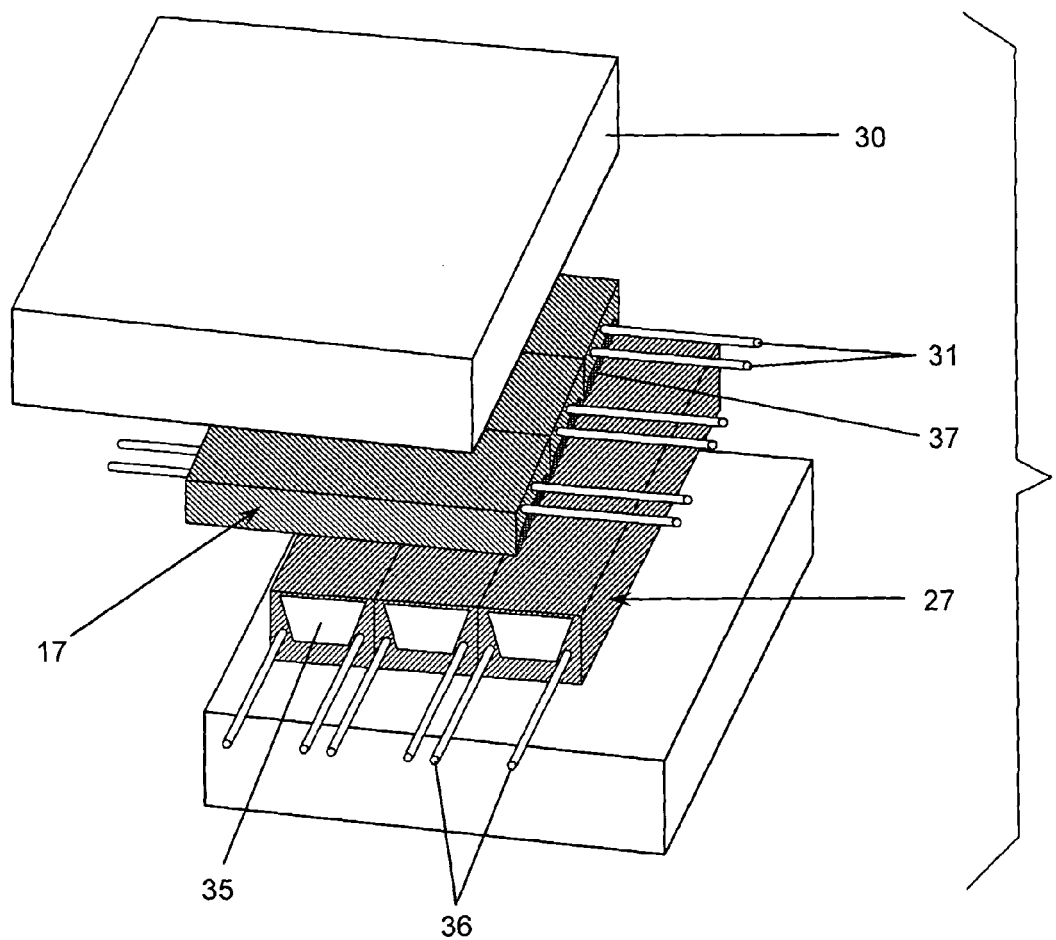
FIG. 4 illustrates a fiber-based plasma-addressed electro-optic display.
Figure 5:
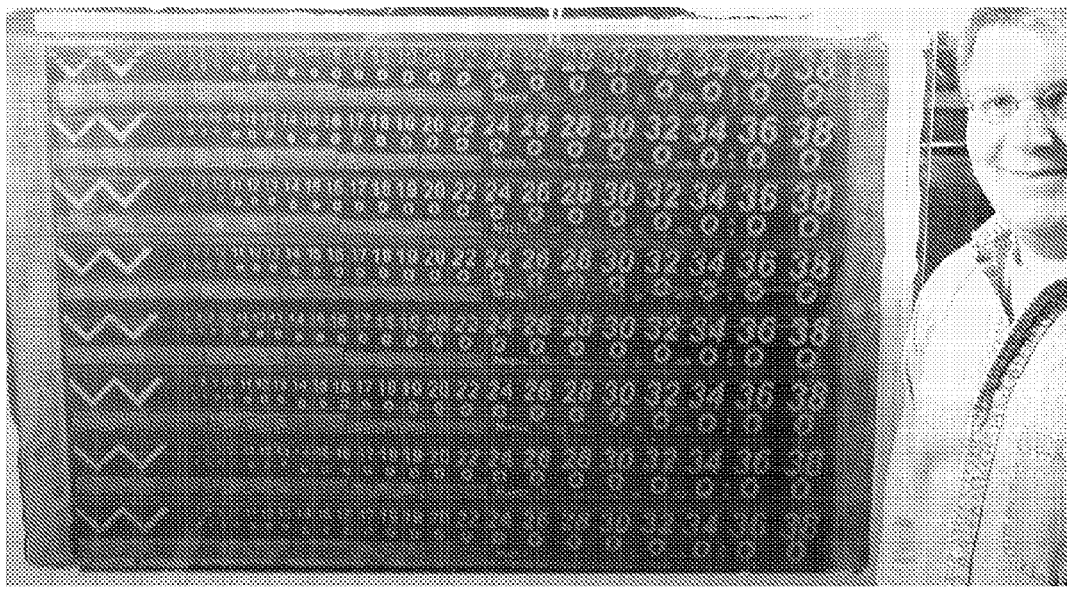
FIG. 5 is a photograph of an operating 46" diagonal 20 dpi fiber-based plasma-addressed display using Gyricon paper as the electro-optic material.

FIG. 4 shows a schematic of a plasma-addressed liquid crystal (PALC) display using both top fibers 17 and bottom tubes 27 to create the structure in the display, as disclosed in U.S. Pat. No. 6,452,332, incorporated herein by reference. Using a structure similar to FIG. 4 and a reflective electro-optic material, disclosed in U.S. Pat. No. 6,459,200, incorporated herein by reference, a 46 inch diagonal (25.5"×38.4") 20 dots-per-inch display was fabricated, as shown in FIG. 5. The 46-inch diagonal display was fabricated using Gyricon paper 37 (shown in FIG. 2) as an electro-optic material 37. The entire width of each pixel could be addressed and optically modulated using column top fiber 17 containing wire electrodes 31 because the thickness of the Gyricon paper 37 was on the order of the pitch of the wire electrodes 31.

Figure 6A:
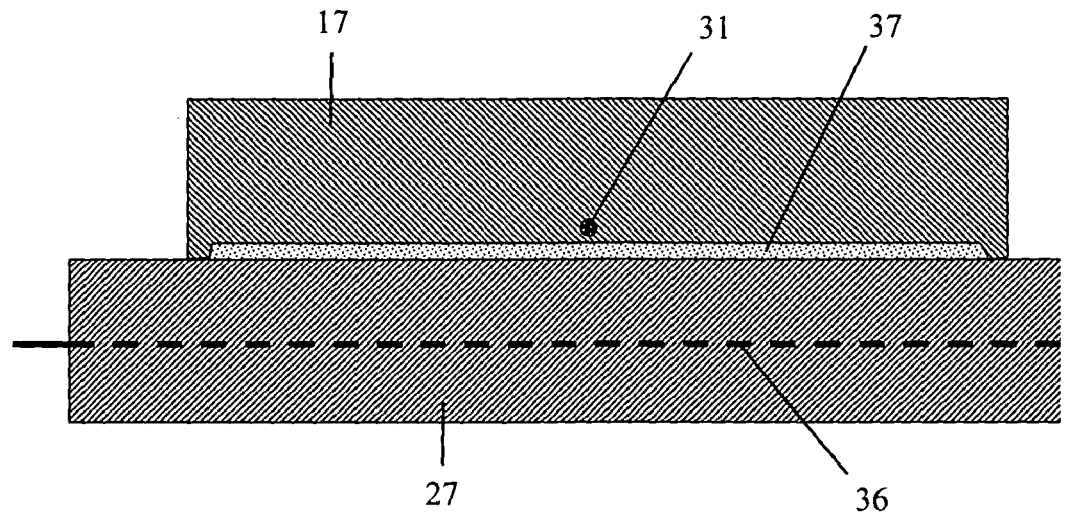
FIG. 6a schematically shows a cross-section of a pixel in a fiber-based plasma-addressed display with a thin electro-optic material.
Figure 6B:
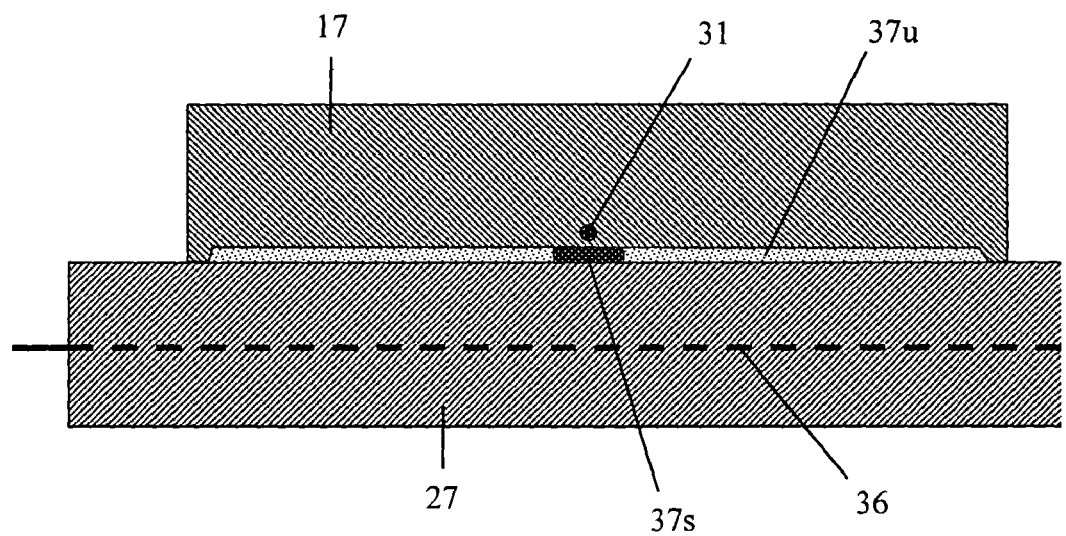
FIG. 6b schematically shows the pixel cross-section in FIG. 6a with the electro-optic material being addressed.

FIG. 6a shows a cross-section of a single pixel in a fiber-based plasma-addressed display. The electro-optic material 37 is sandwiched between a top fiber 17 and a hollow plasma tube 27. In the case of a liquid crystal electro-optic material 37 or an electrophoretic electro-optic material 37, the cell gap or gap between the top fiber 17 and the bottom plasma tube 27 is preferably between 2 and 25 micrometers. This very thin electro-optic cell gap places the column wire addressing electrode 31 very close to the active charge collection region in the plasma tube 27. Because of this small cell gap, the electro-optic material 37s is only modulated below the column electrode 31 during addressing, as shown in FIG. 6b. To modulate the remaining electro-optic material 37u the electric field from the column electrode 31 has to be spread across the width of the top fiber 17. The traditional method of creating wide column address electrodes 31 is to pattern Indium Tin Oxide (ITO) strips on a glass or plastic substrate and connect directly to the ITO strips with the drive electronics. This method works fine for small displays, however at larger sizes the ITO film is not conductive enough to uniformly set the charge along the length of the ITO strips. Also, large patterned ITO plates are costly and difficult to manufacture.

FIG. 7 shows a method of coating the surface of a fiber 17 with a conductive film 41 to spread the charge across the surface of the fiber 17. The conductive film 41 in the light path is preferably transparent. Since all the capacitive current is carried in the wire electrode 31, the film 41 can have a low conductivity and is only required to be conductive enough to spread the charge across the surface of the fiber 17 and not along its length. The transparent conductive layer 41 may be a traditional coating like ITO or a novel transparent film containing carbon nanotubes. Carbon nanotubes are preferable since they are much easier to apply to the surface of the fiber than an ITO film.

Figure 7A:
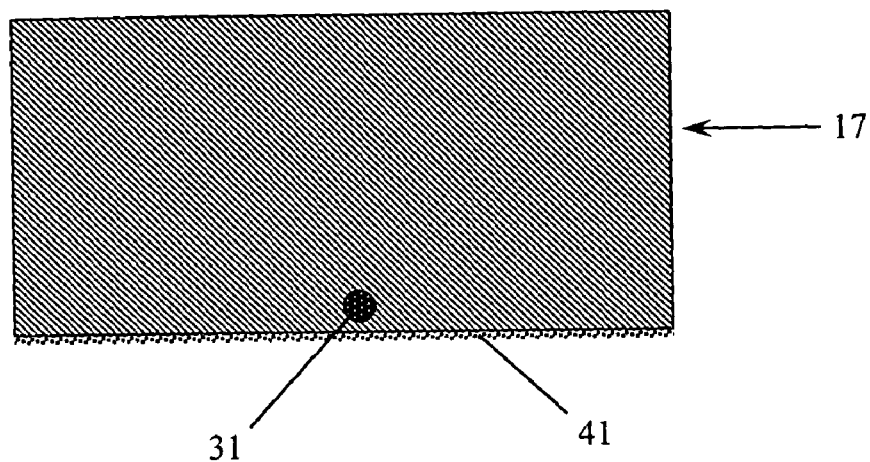
FIG. 7a schematically shows a cross-section of a top fiber structure with a transparent conductive coating on the surface of the fiber.

FIG. 7a shows a conductive coating only on the surface that is in contact with the electro-optic material. Coating only one surface of the fiber 17 requires the wire electrode 31 to be placed in the center of the fiber or in the middle of the light path. Also, only about one half of the voltage placed on the wire electrode 31 is capacitively coupled to the transparent conductive coating 41 (the coating 41 only intersects about ½ of the electric field flux from the wire electrode 31).

Figure 7B:
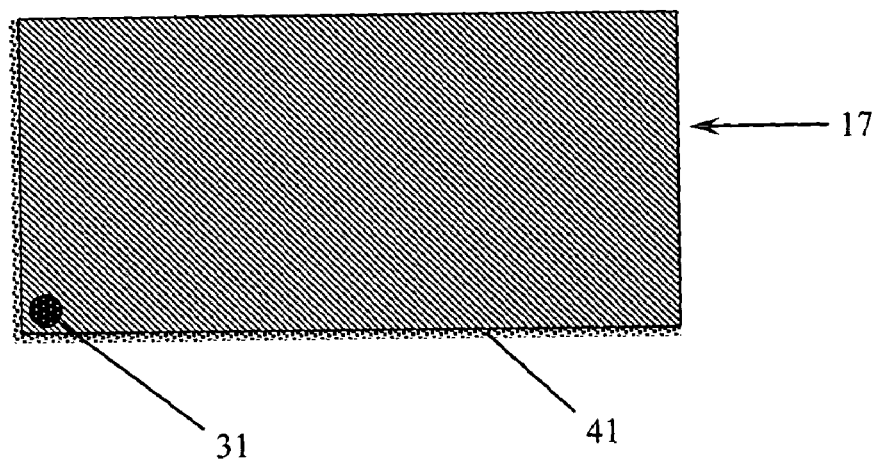
FIG. 7b schematically shows a cross-section of a top fiber structure with a transparent conductive coating on two adjacent fiber surfaces.
Figure 7C:
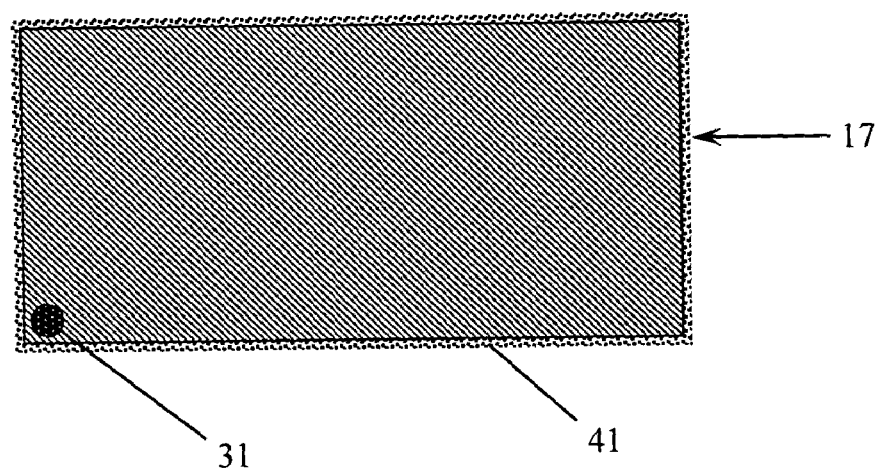
FIG. 7c schematically shows a cross-section of a top fiber structure with a transparent conductive coating on all surfaces of the fiber.

FIG. 7b shows a modified version of the transparent conductive coated 41 fiber 17 surface. In this example, two adjacent fiber 17 surfaces are coated and the wire electrode 31 is moved into the corner of the fiber 17. Placing the wire electrode 31 in the corner of the fiber 17 moves it out of the light path and combining its location with two adjacent coated 41 fiber 17 surfaces capacitively couples about two thirds of the voltage to the charge spreading coating 41. Coupling most of the capacitive voltage from the wire electrode 31 to the transparent conductive film 41 may be accomplished by totally enclosing the wire electrode 31 with the conductive film 41 by coating the entire surface of the fiber 17, as shown in FIG. 7c. Totally encompassing the wire electrode 31 with the conductive coating 41 transfers almost 100 percent of the voltage placed on the wire electrode 31 to the conductive coating 41. This method of coating the surface of the fiber 17 with a transparent conductive coating 41 transfers the column voltage applied to the wire electrode 31 to the entire surface of the fiber 17. It is important to keep the individual fibers 17 electrically isolated from each other when they are arrayed to form individually addressable column electrodes.

Figure 8A:
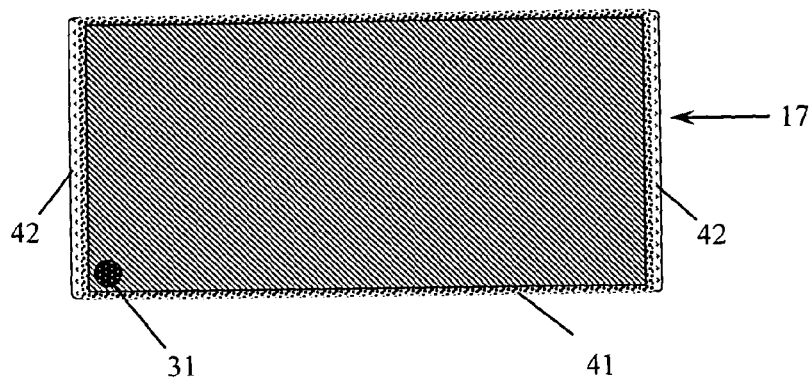
FIG. 8a schematically shows a cross-section of a top fiber structure with an insulative coating on the sides of the fibers over the transparent conductive coating to electrically isolate the fibers when they are arrayed.
Figure 8B:
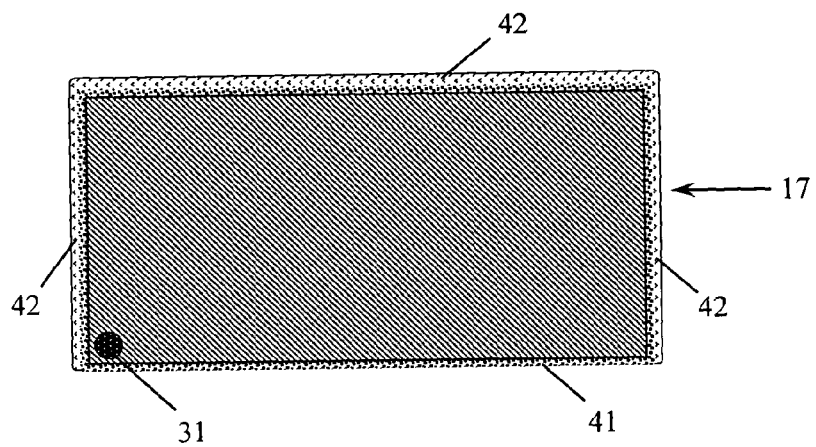
FIG. 8b schematically shows a cross-section of a top fiber as in FIG. 8a with an additional insulative coating on the top of the fiber.
Figure 8C:
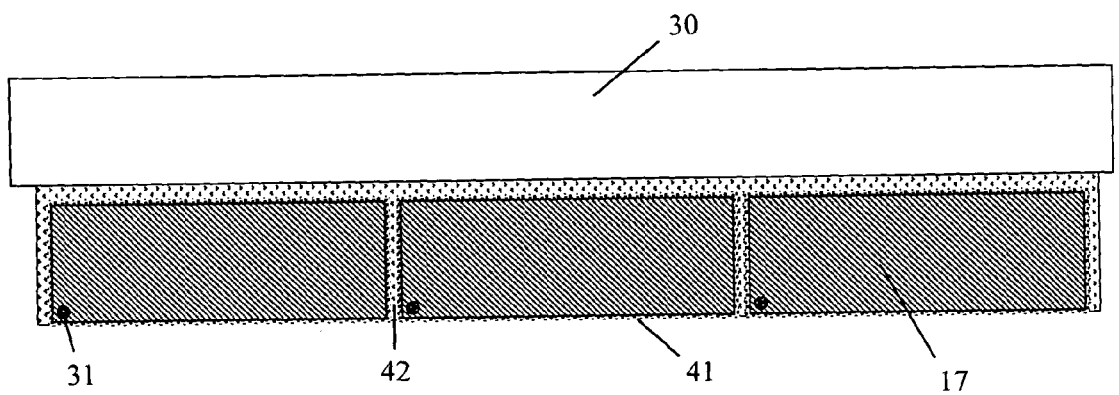
FIG. 8c schematically shows an array of top fiber structures as shown in FIG. 8b where the insulative coating both separates the transparent conductive coated fibers and removes the reflection with the top substrate.

FIG. 8a shows a method of adding an additional insulative coating 42 to the sides of the fibers 17 to act as an electrical isolation barrier between the conductive coating 41 in two adjacent fibers 17 when they are arrayed, as shown in FIG. 8c.

The conductive coating 41 or the isolation barrier coating 42 may be applied to the fiber 17 surface during the fiber draw process. The most simple method of applying the coating(s) (41 or 42) is to die coat the fiber or pull the fiber through a solution containing the coating material during the fiber draw process. The coatings 41 or 42 may also be sprayed onto the fiber 17 during the fiber draw process or after the fiber has been drawn onto a drum. The coatings 41 or 42 may alternatively also be applied using a physical vapor deposition process during or after the fiber draw process.

FIG. 8b shows a method of adding an additional coating 42 to the top of the fiber 17 to remove the reflection of the top interface when laminated to a substrate 30, as shown in FIG. 8c. The coating 42 on the top of the fiber 17 is preferably transparent to allow transmission of light through the top electrode plate structure. A coating 42 on the top of the fibers 17 also helps to planarize the bottom of the fiber 17 array during a post heating process used to flow the reflection reducing coating 42. If the coating 42 on the sides of the fibers 17 is also transparent then the coating 42 also serves to reduce any reflection between the fibers 17 when they are arrayed, as shown in FIG. 8c.

Figure 9A:
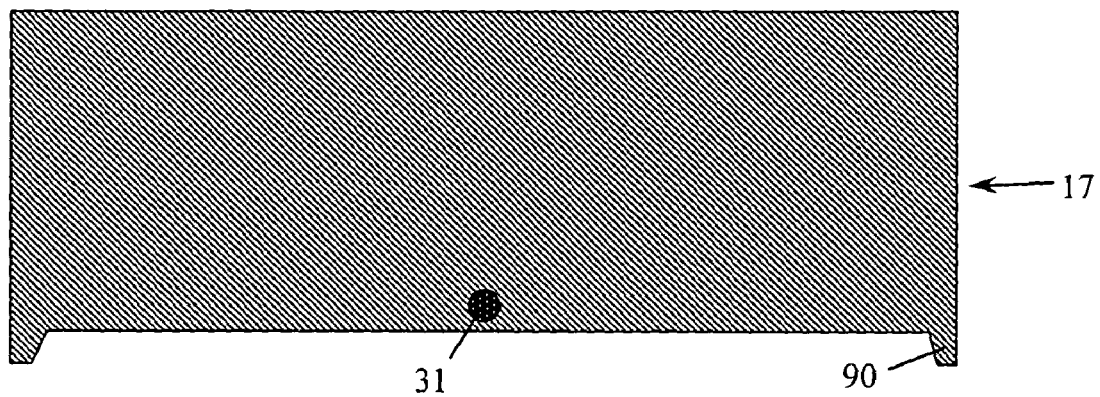
FIG. 9a schematically shows a cross-section of a top fiber structure with short legs on the sides of the fiber.
Figure 9B:
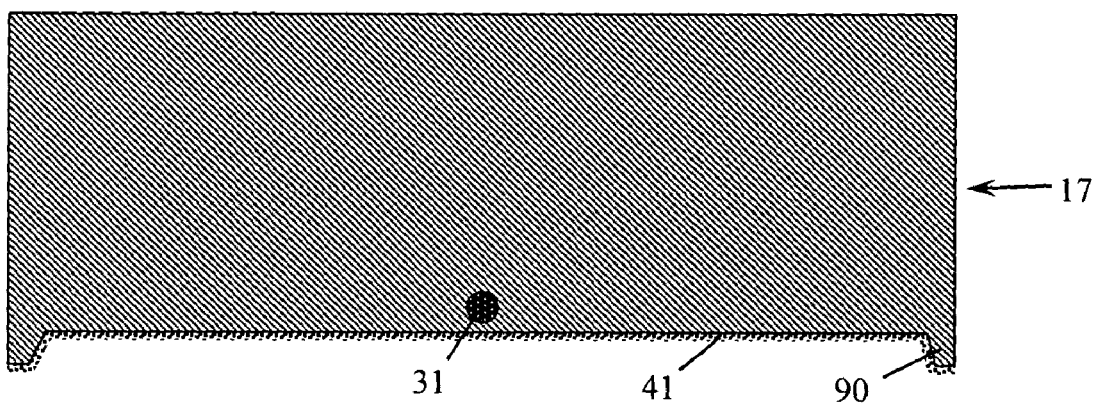
FIG. 9b schematically shows a cross-section of the fiber in FIG. 9a with the surface coated with a transparent conductive coating.
Figure 9C:
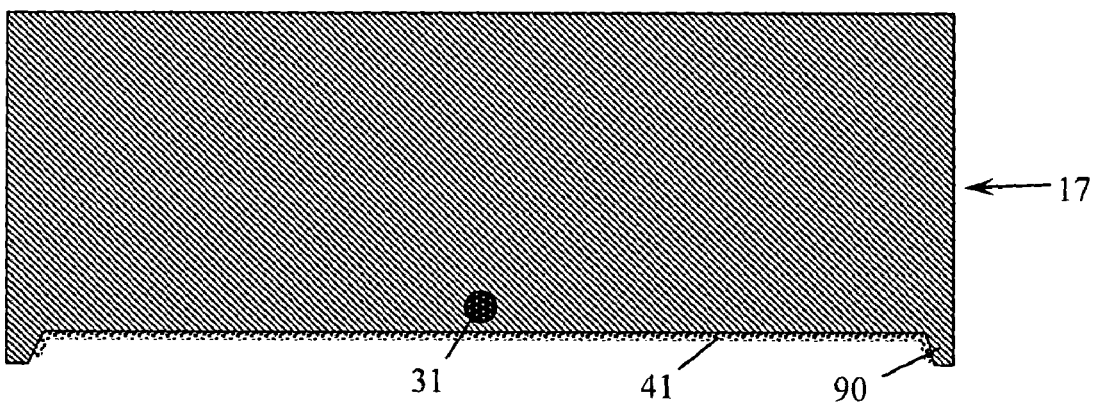
FIG. 9c schematically shows a cross-section of the fiber in FIG. 9b with the transparent conductive coating removed from the top of the legs on the sides of the fiber.

FIG. 9 depicts another method of coating the top fibers 17 with a conductive layer 41 and keeping the conductive coating 41 on the fibers 17 electrically isolated after the fibers 17 are arrayed. FIG. 9a shows a top fiber 17 with short legs 90 on the bottom sides of the fiber 17 surface. Coating the surface of the fiber 17 with a conductive layer 41, shown in FIG. 9b, coats the entire bottom surface of the fiber 17 including the legs 90. The conductive coating 41 may be removed from the top of the legs 90, as shown in FIG. 9c, for example by using a scraping tool, like a razor blade hooked to a vacuum port. Therefore, when the fibers 17 are arrayed, the transparent conductive coating 41 on each fiber 17 is electrically isolated from the conductive coating 41 on the adjacent fiber 17.

Figure 10A:
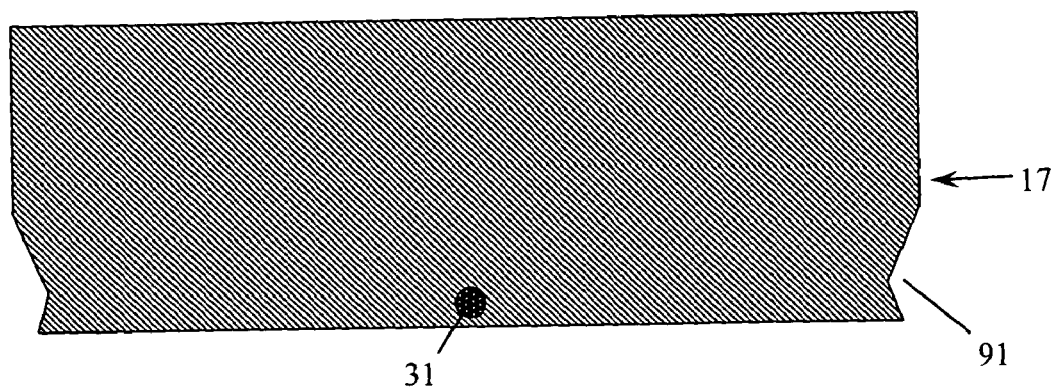
FIG. 10a schematically shows a cross-section of a top fiber structure with recessed sides to shadow the bottom of the fiber from the sides.
Figure 10B:
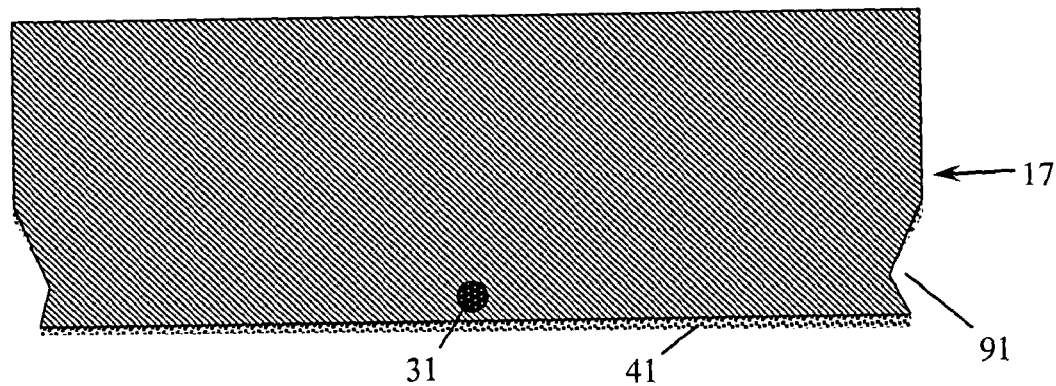
FIG. 10b schematically shows a cross-section of the fiber in FIG. 10a with the bottom of the fiber coated with a transparent conductive coating.

FIG. 10 depicts another method of coating the fibers 17 with a conductive layer 41 and keeping the conductive coating 41 on the fibers 17 electrically isolated after the fibers 17 are arrayed. FIG. 10a shows a fiber 17 with recessed sides 91 which shadows the bottom surface of the fiber 17 from its sides. Using a directional coating method or a contact coating method, a transparent coating 41 is applied to the bottom surface of the fiber 17. The recessed sides 91 terminate the coated surface before the transparent coating 41 reaches the edge of the fiber 17. Therefore, when the fibers 17 are arrayed the transparent conductive coating 41 on each fiber 17 is electrically isolated from the conductive coating 41 on the adjacent fiber 17.

Figure 11:
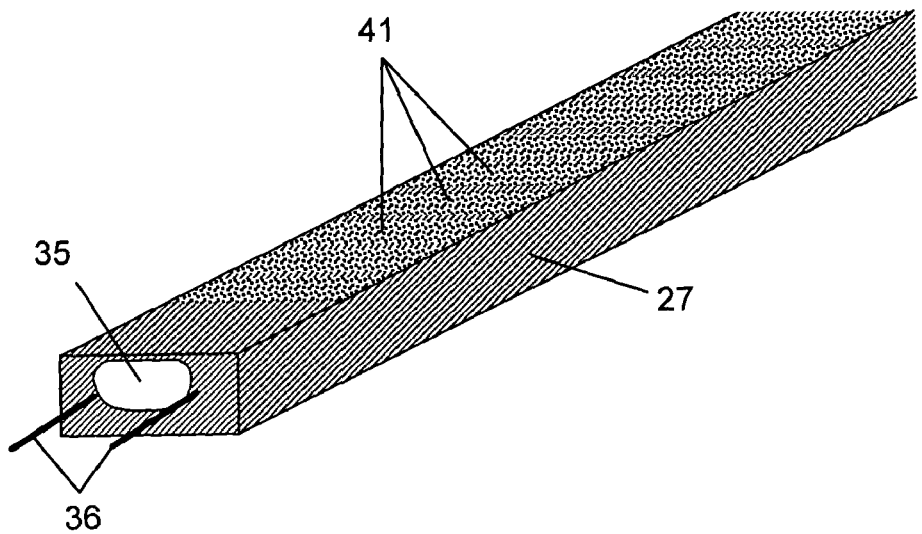
FIG. 11 schematically shows a plasma tube with conductive patches along the length of the tube to spread the charge, plated-out inside the tube during addressing, across the width of the tube.

FIG. 11 shows a method of adding electrically conductive patches 41 to the top surface of a plasma tube 27 to spread the charge plated out in the plasma channel 35 across the entire surface of the tube 27. These conductive patches 41 are preferably discontinuous along the length of the tube 27. For proper pixel addressing the conductive patches 41 are preferably either the same width as the column electrodes and aligned to the column electrodes or at least one third the width of the column electrodes. Using conductive patches 41 on the surface of the plasma tubes 27 allows the use of a much smaller plasma cell 35, which in turn may lead to the fabrication of a much stronger and crush resistant tube 27.

The above examples of spreading the charge across the surface of the fiber show a method of using a capacitive coupling where the wire electrode carrying the voltage and current is not in direct contact with the transparent conductive coating. This capacitive coupling works well if the voltage pulses used in addressing the displays are very short and the capacitive coupling between the transparent conductive coating 41 and the rest of the system is low. However, in order to address an electro-optic material that requires a long addressing time (several milliseconds), like passively addressing a liquid crystal display, or panels that have high coupling capacitance, the transparent conductive layer 41 has to be electrically or resistively connected to the wire electrode.

Figure 12:
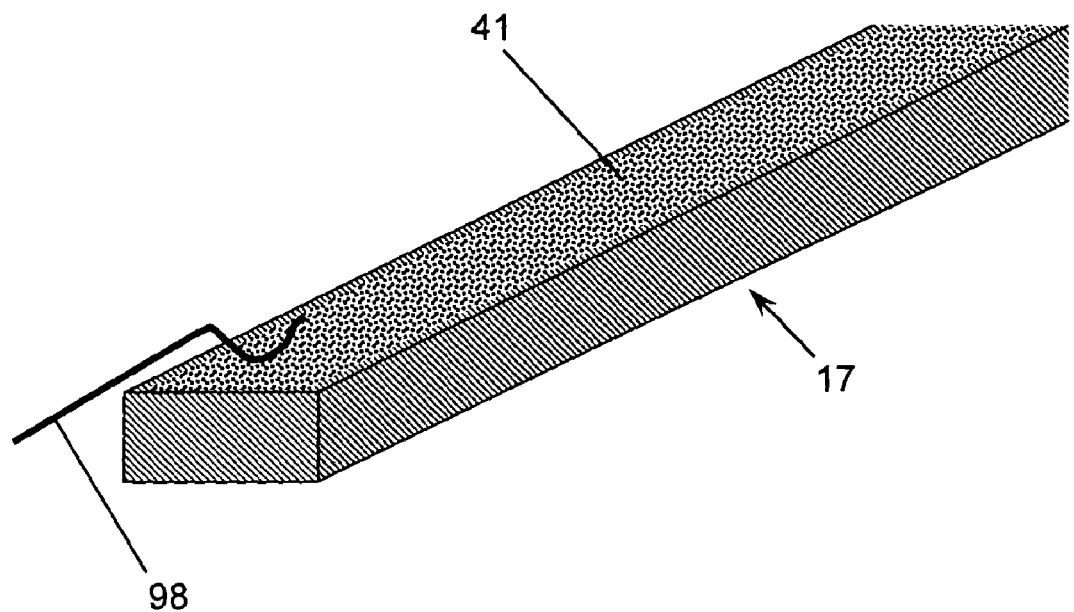
FIG. 12 schematically shows a fiber coated with a transparent conductive coating which is electrically connected to a driver lead.

FIG. 12 shows the most simple structure where the conductive layer 41 is connected 98 to the drive electronics. In this case, the fiber 17 is coated with a transparent conductive layer 41 on the surface that is in contact with the electro-optic material and the conductive layer 41 is directly connected 98 to the drive electronics. However, in order for this type of coating 41 to be useful in a flat panel display, the coating 41 is preferably transparent. Although forming the column or row electrodes 41 in a fiber 17 and arraying the fibers 17 to form a panel is easier to manufacture in large sizes than patterning them on a plate of glass or plastic, it still has the same addressing issues. Traditional transparent conductive coatings are too resistive to reliably address electro-optic materials over long lengths. The conductivity of the coatings may be increased, but only at the expense of lowering the light transmission through the coating. One method of solving this low conductivity issue is to add a metal bus electrode to carry the current and use the transparent conductive electrode to spread the charge across the surface of the pixel.

Figure 13:
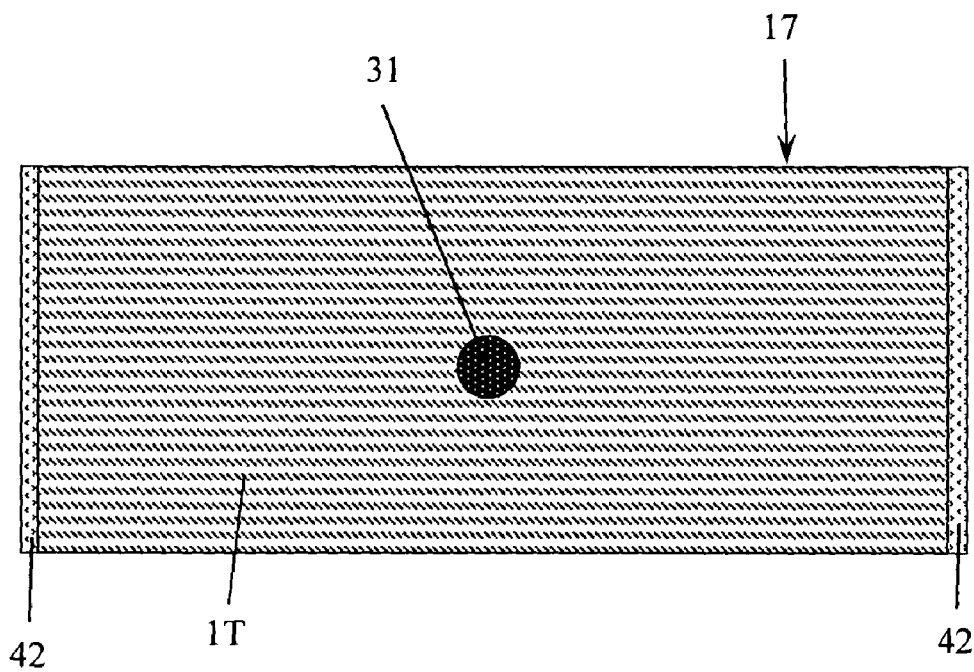
FIG. 13 schematically shows a cross-section of a fiber composed of a transparent conductive material and a wire electrode.

FIG. 13 shows a fiber 17 made out of a transparent conductive media 1T to spread the charge to the surface of the fiber 17 and a conductive electrode 31 to carry the current along the length of the fiber 17. In order for the voltage to be spread to the surface of the fiber, the transparent conductive media 1T that forms the bulk of the fiber 17 has to be electrically connected to the wire electrode 31 along the length of the fiber 17. In order for the conductive fibers 17 to be electrically isolated from their adjacent fibers when arrayed, at least one of the sides has to be coated with a dielectric isolation layer 42. The fiber material 1T is preferably any transparent conductive material like a conductive polymer or a blend of conductive nanoparticles in a polymer matrix.

Figure 14:
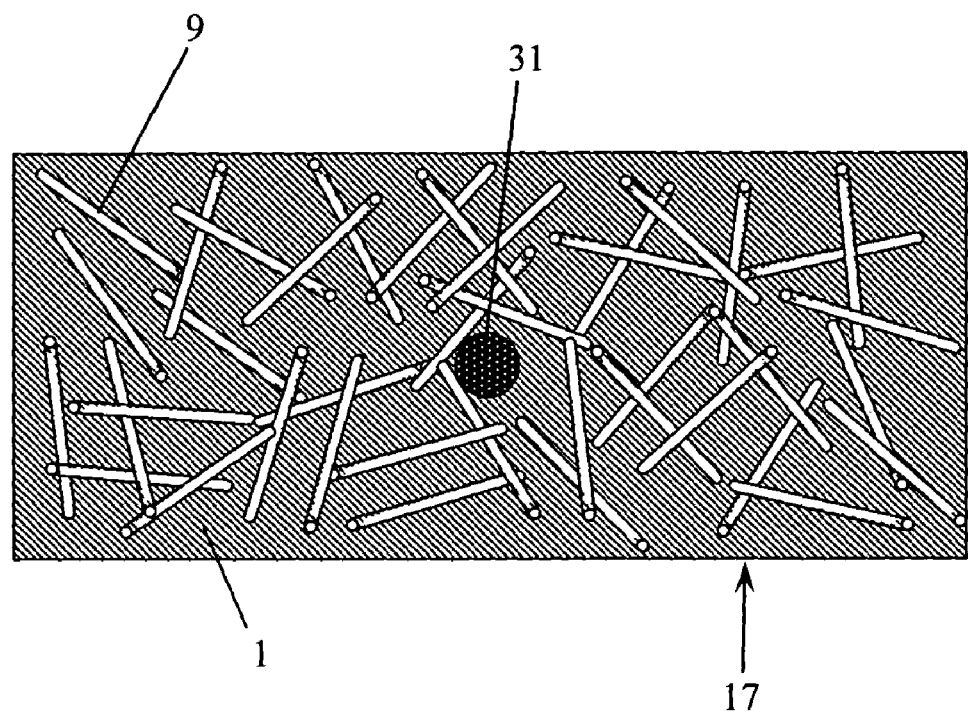
FIG. 14 schematically shows a cross-section of a fiber containing carbon nanotubes throughout the fiber to spread the voltage from the wire electrode to the surfaces.
Figure 15:
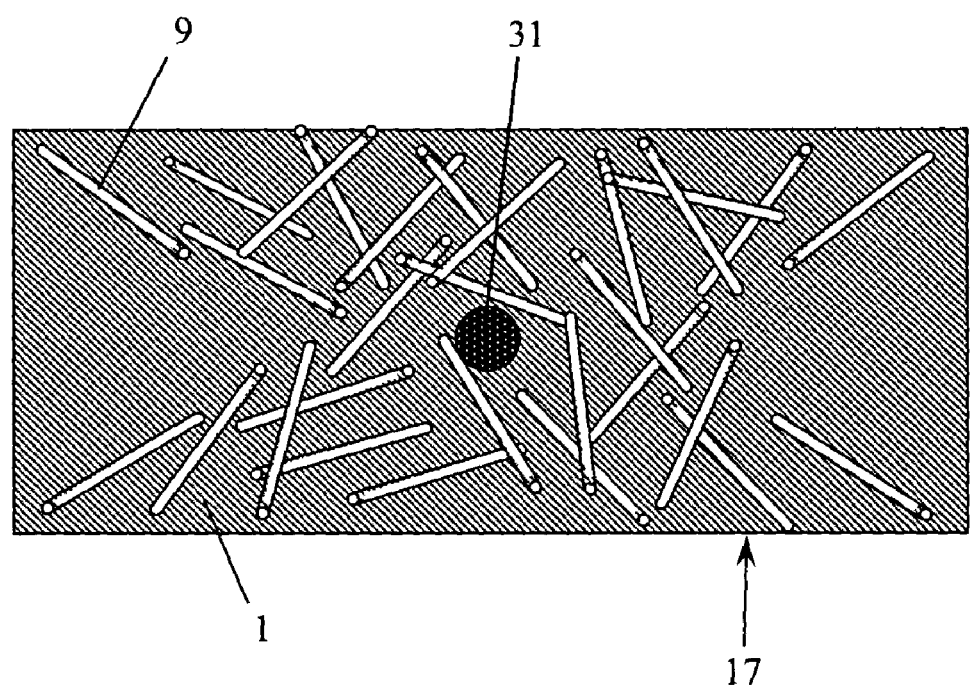
FIG. 15 schematically shows a cross-section of a fiber containing carbon nanotubes where the nanotubes are arranged throughout the top and bottom of the fiber to only spread the voltage from the wire electrode to the top and bottom surfaces.

FIG. 14 shows an example where the conductive fiber material 1T in FIG. 13 is composed of carbon nanotubes 9 dispersed in a polymer matrix 1. A wire electrode 31 is included in the fiber 17 to carry the bulk of the current along the length of the fiber. FIG. 15 shows a slight modification from FIG. 14 where the nanotubes 9 are not located in the sides of the fiber 17. Keeping the nanotubes 9 out of the sides of the fibers 17 stops the electrical conduction from fiber 17 to adjacent fiber 17 when arrayed. The absence of nanotubes 9 in the side of the fiber also lowers the capacitive coupling between adjacent fibers 17 in an array. One potential issue with dispersing nanotubes 9 in the fibers 17 is that the electric field only has to be spread to the surface of the fiber 17 and not throughout the fiber 17. Also, in order to obtain a high enough conduction from the wire electrode 31 to the surface of the fiber 17 a high loading of nanotubes 9 is required. This high nanotube 9 loading creates more light absorption and increase the cost of the fiber, as a result of the increased cost of the nanotubes 9.

Figure 16:
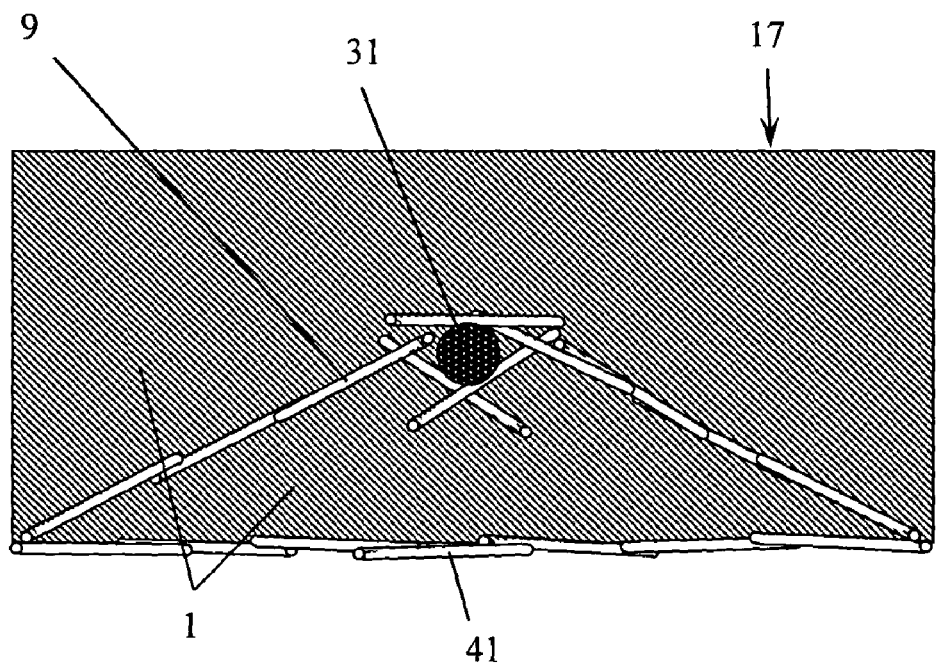
FIG. 16 schematically shows a cross-section of a fiber containing carbon nanotubes where the nanotubes are arranged in planes inside the fiber to only spread the voltage from the wire electrode to the bottom surface.

FIG. 16 shows a method of electrically connecting the conductive wire electrode 31 in the fiber 17 to a transparent carbon nanotube 9 coating on the surface 41 by creating a conductive path through the fiber 17 using nanotubes 9. In this case, the nanotubes 9 inside the fiber 17 and the conductive nanotube surface layer 41 only have to be conductive enough to spread the voltage applied to the conductive wire electrode 31 across the surface of the fiber 17. Therefore, a highly transparent low conductive nanotube 9 layer may be used. The conductivity of the nanotube 9 layer only has to be equivalent to an antistatic coating since it only has to spread the charge from the conductive wire electrode 31 across the surface of the fiber 17. Assuming a 20 dots-per-inch (dpi) display the charge spreading distance is only about 1.5 millimeters.

Figure 17:
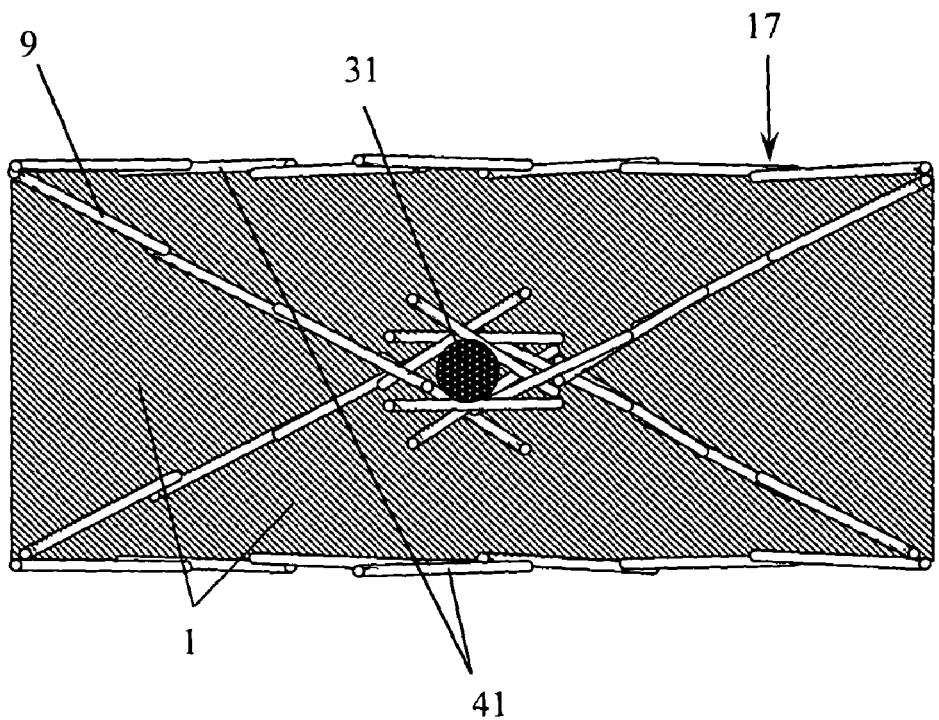
FIG. 17 schematically shows a cross-section of a fiber containing carbon nanotubes where the nanotubes are arranged in planes inside the fiber to spread the voltage from the wire electrode to the top and bottom surfaces.

FIG. 17 shows a fiber 17 structure with a transparent conductive layer 41 made using carbon nanotubes 9 that spreads the charge from the conductive wire electrode 31 to both the top and bottom fiber 17 surfaces. Spreading the charge to both surfaces is advantageous if building a double-sided display, like the one explained in U.S. Provisional Patent Application 60/665,781 "Double-Sided Fiber-Based Displays", filed Mar. 28, 2005, and incorporated herein by reference. Spreading the charge to both surfaces is also advantageous when designing a multi-layer display like a reflective color cholesteric liquid crystal display explained below.

Figure 18:
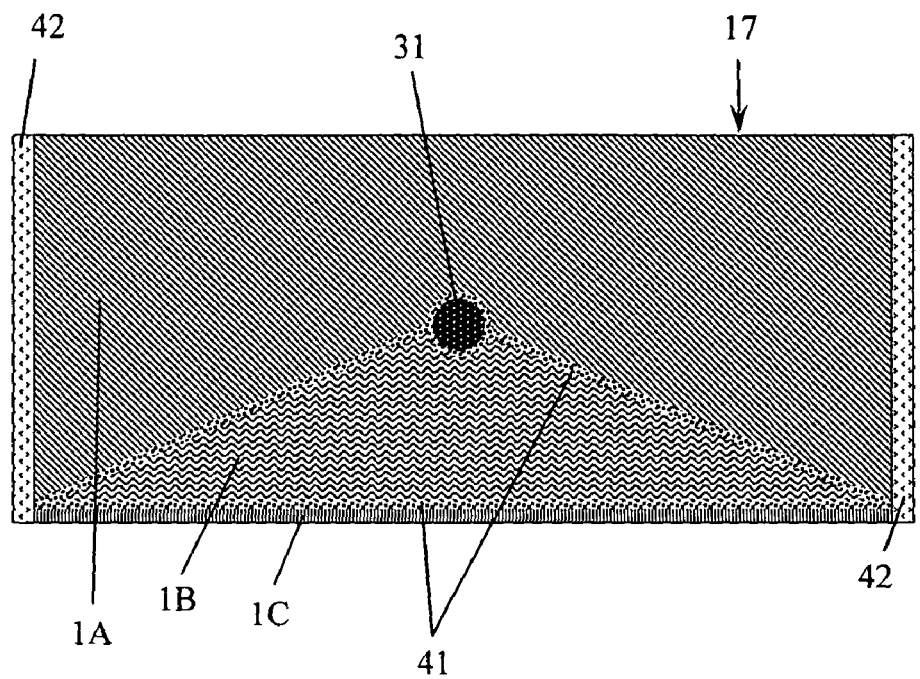
FIG. 18 schematically shows a cross-section of a fiber similar to that of FIG. 16 with dielectric isolation layers on the sides of the fiber.

FIG. 18 shows a fiber 17 similar to that depicted in FIG. 16. The polymer or glass material 1B that is encompassed by the conductive layer 41 that connects the wire electrode 31 to the surface of the fiber 17 may be composed of a different material 1B than the material 1A that makes-up the rest of the fiber 17. The conductive layer 41 is preferably made of any conductive material. If the operation of the display requires that light is transmitted through the fiber 17, like most applications require, then the conductive layer 41 must be transparent. A transparent conductive layer 41 may be composed of a transparent conductive material including, but not limited to, indium tin oxide, ITO, or fluorine doped zinc oxide (ZnO:F), but these materials are very difficult to apply and usually require a physical vapor deposition process like e-beam evaporation or sputtering. Another method of creating a transparent conductive layer uses conductive nanoparticles that when dispersed on a surface or in an interface are too small to block light, but connect together to form a conductive path. A preferred example of this type of material is carbon nanotubes. Nanotubes and nanowires have very high aspect ratios and are very conductive along the length of their structures. Therefore, they can be very thinly (a monolayer or two) applied to a surface in a criss-crossing fashion to create a conductive surface. Since they have such a high aspect ratio their area coverage on the surface is extremely low, hence blocking minimal light. In one preferred embodiment, the nanoparticle layer is at least 75% transparent to light. These nanoparticles may be in the form of nanotubes, nanowires, nanoplatelets, or other shapes that form a cohesive conducting network when applied to a surface and block minimal light. The conductive layer 41 may also be composed of a transparent conductive polymer. There are several transparent conductive polymers; one that is readily available is PEDOT or polyethylene-dioxithiophene sold by AGFA. In certain display structures a black absorbing layer or a reflective layer is required. In these cases, the ways to create and coat the conductive layer vary widely. In most cases, a metal particle slurry coating is the most economical path. Depending on the exact shape of the two pieces 1A and 1B that make-up the fiber, a dielectric isolation layer 42 may be required to electrically isolate the conductive layers 41 in adjacent fibers. Certain fabrications techniques may also require that the conductive layer 41 be covered by a third material 1C. This third material 1C can be the same composition as the other materials that comprise the bulk of the fiber 1A and 1B or can be a different material to serve another function, such as electrically isolating the conductive material 41 from the surface of the fiber 17.

Figure 19A:
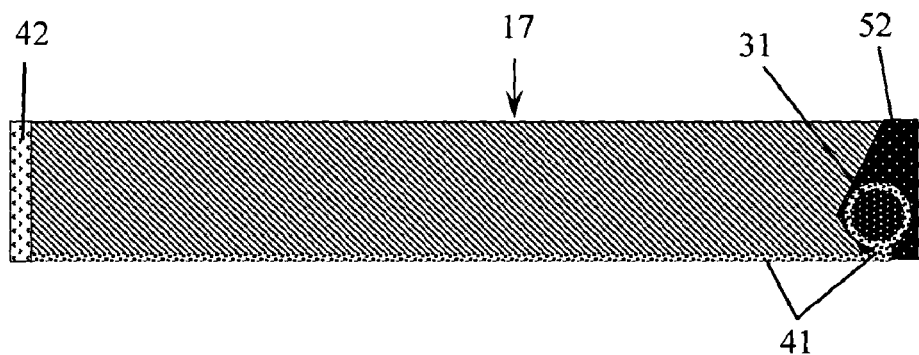
FIG. 19a schematically shows a cross-section of a fiber with a transparent conductive coating on the surface that is connected to a wire electrode which is imbedded in a black absorbing layer.
Figure 19B:
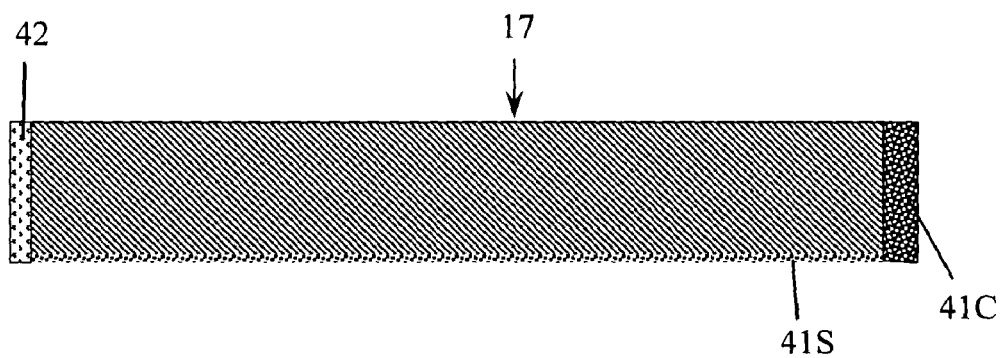
FIG. 19b schematically shows a cross-section of a fiber similar to that of FIG. 19a where the wire electrode is replaced with a highly conductive material.

FIG. 19a shows a fiber 17 with a much higher aspect ratio. The height of the fiber is drastically reduced, which makes it advantageous for applications where a display with a wide viewing angle is desired. The conductive wire electrode 31 is moved out of the center of the fiber (main light path) to the edge of the fiber 17, where it is encased in a black absorbing layer 52 that both removes any reflection or color from the wire electrode 31 and serves a black matrix function. The conductive wire electrode 31 is connected to the transparent conductive layer 41, which spreads the charge across the fiber 17 surface. A dielectric isolation layer 42 is coated on the side of the fiber to electrically isolate adjacent arrayed fibers 17. The conductive wire electrode 31 may be replaced with a conductive region 41C, as shown in FIG. 19b. The conductive region 41C is preferably composed of a high concentration of nanotubes, or metal particles that are fused together in a polymer binder. However, connecting this conductive region 41C to the drive electronics at the edge of the panel is more complicated than simply stripping the fiber 17 material 1 off of a wire electrode 31, such as copper wire, and soldering it directly to a printed circuit board, which contain the drive electronics.

Figure 20:
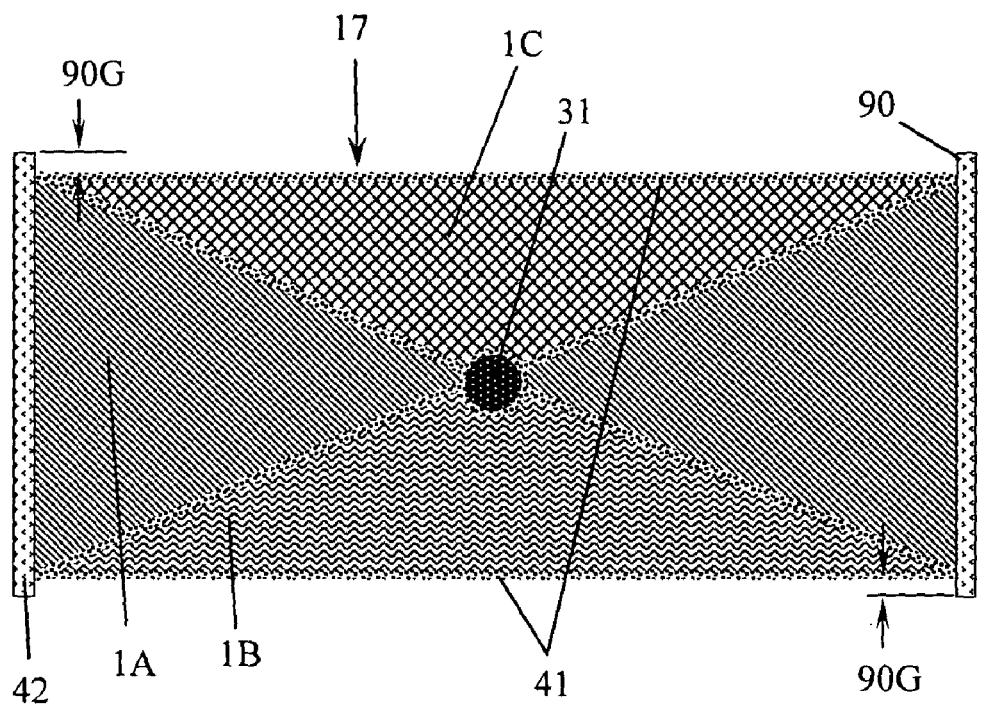
FIG. 20 schematically shows a cross-section of a fiber with a dielectric isolation layer on the sides of the fiber that create a cell gap.
Figure 21:
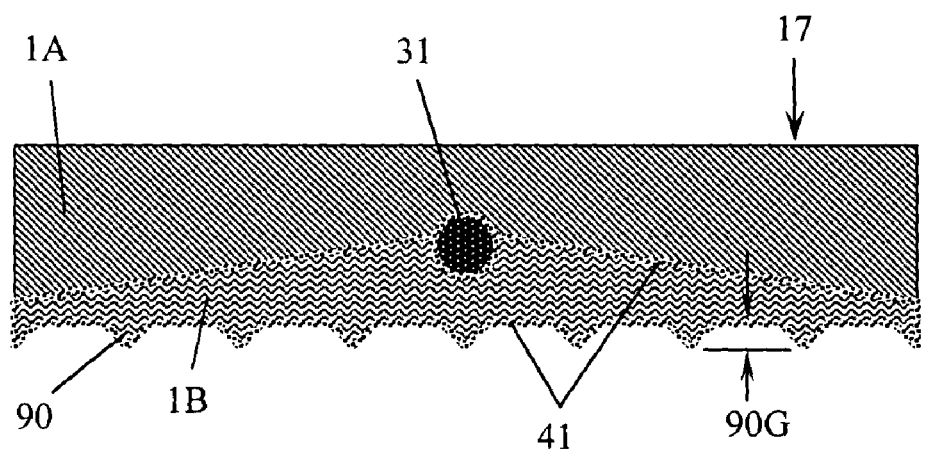
FIG. 21 schematically shows a cross-section of a fiber with cell gap legs designed into the surface of the fiber to create a cell gap.

FIG. 20 shows an example of using the dielectric isolation layer 42 applied to the sides of the fiber 17 to create a cell gap 90G when the fiber is placed against a surface. Controlling the coating process, extrusion die shape or shape of the preform in the fiber draw may create cell gap legs 90 that extend away from the fiber 17 surface to create the cell gap 90G. Designing the cell gap legs 90 into the fibers 17 creates a uniform cell gap 90G when the fiber arrays are assembled into a panel. Cell gap legs 90 are important when designing a fiber-based display since each fiber 17 may conform to any surface structure. The fibers can twist sideways if one side is elevated or they can dip up and down along the length making it very difficult to control the cell gap. If the aspect ratio is changed such that the height is very small compared to the width, as shown in FIG. 21, and the fiber 17 is flexible across the fiber 17 surface, then cell gap legs 90 have to be designed into the fiber in several locations across the surface of the fiber 17 to control the cell gap 90G across the fiber 17 surface. Composing the fiber 17 out of two different materials 1A and 1B may also add some stress into the fiber 17, which may tend to bow the fiber 17 across the surface. In this case, cell gap legs 90 help to keep a uniform gap 90G during panel assembly.

Figure 22A:
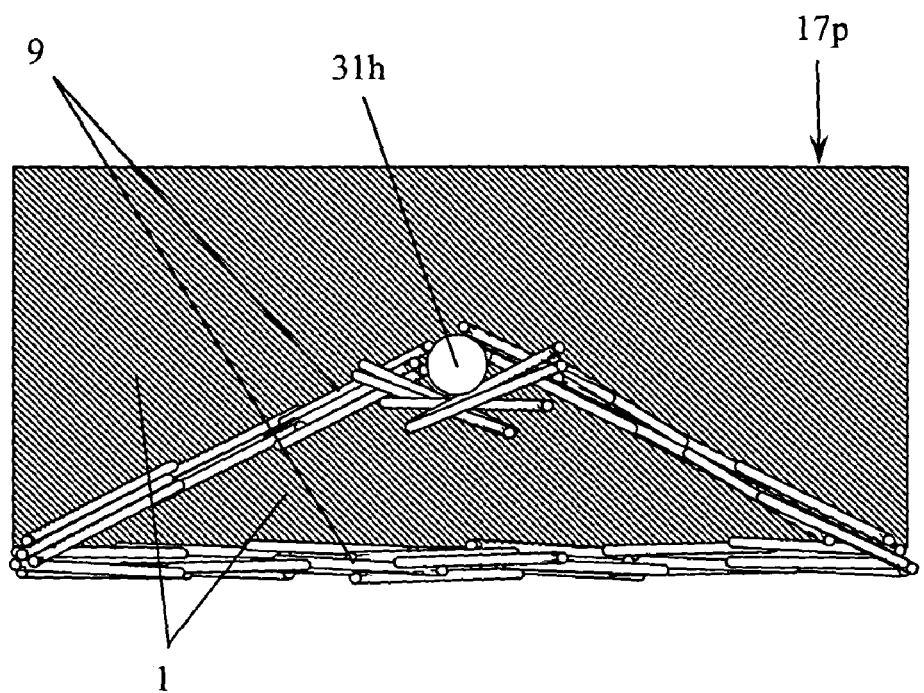
FIG. 22a schematically shows a cross-section of a preform with carbon nanotubes in planes inside the preform to connect a center hole to the surface of the preform.
Figure 22B:
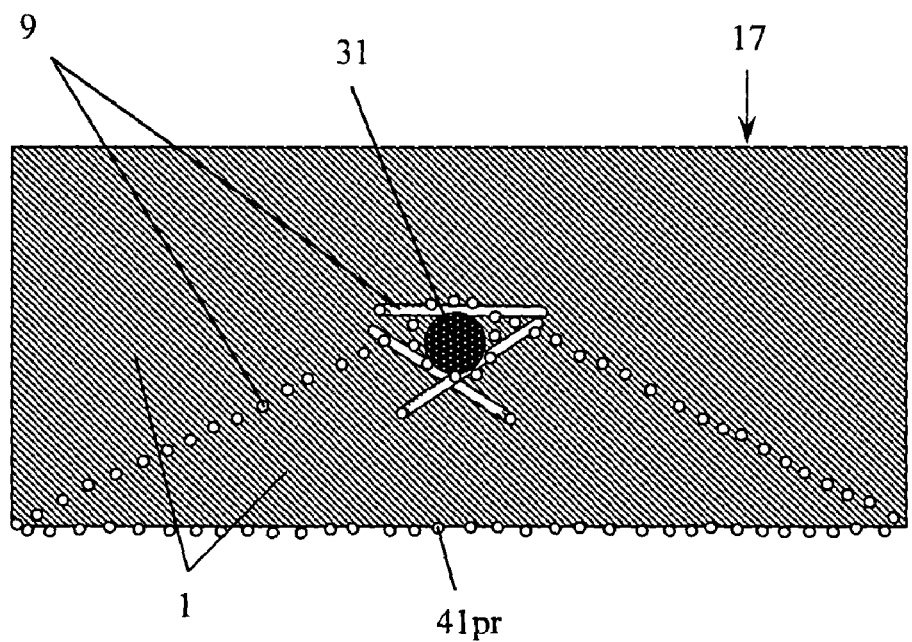
Figure 22C:
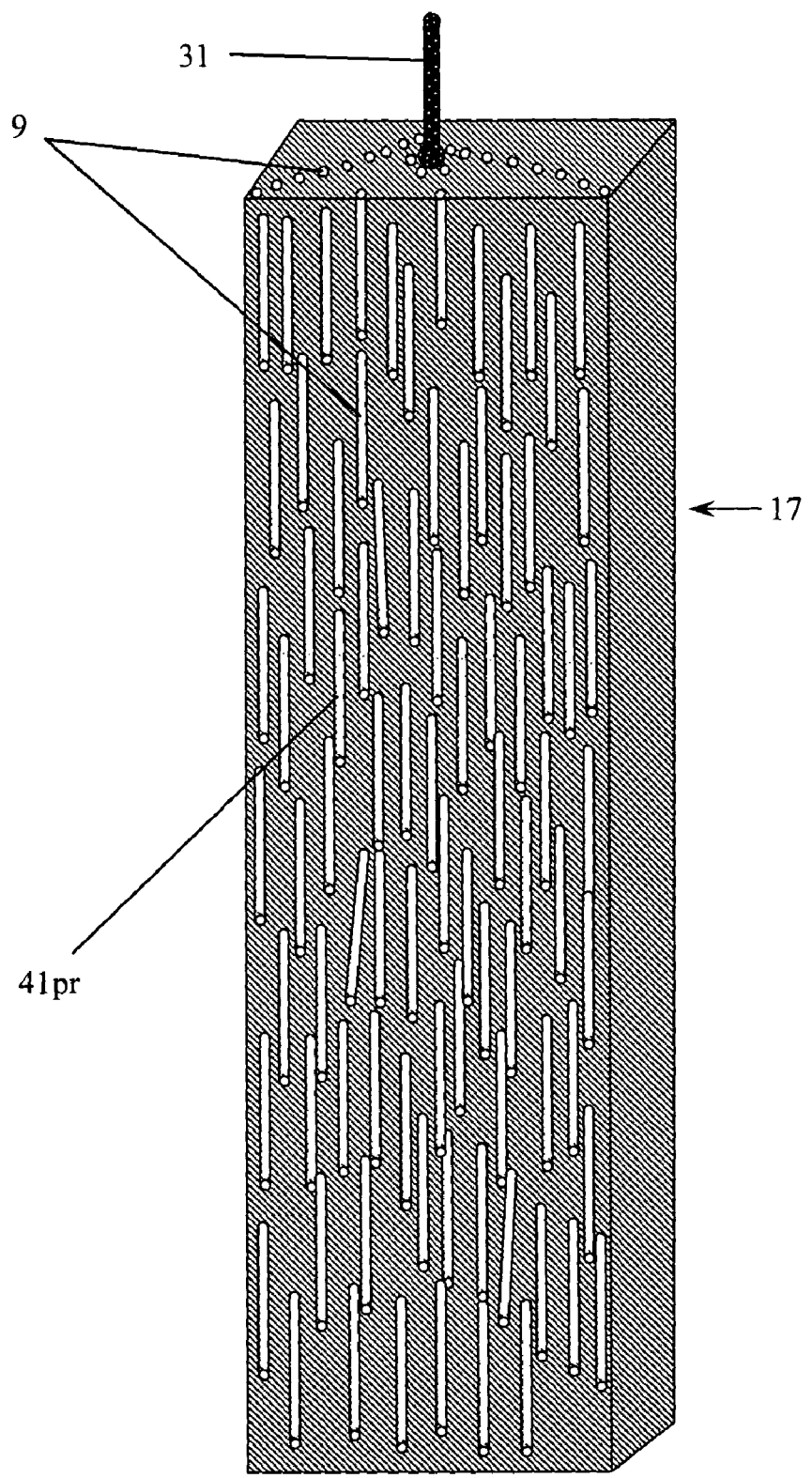
FIG. 22c schematically shows a planar-view of the fiber in FIG. 22b.
Figure 23:
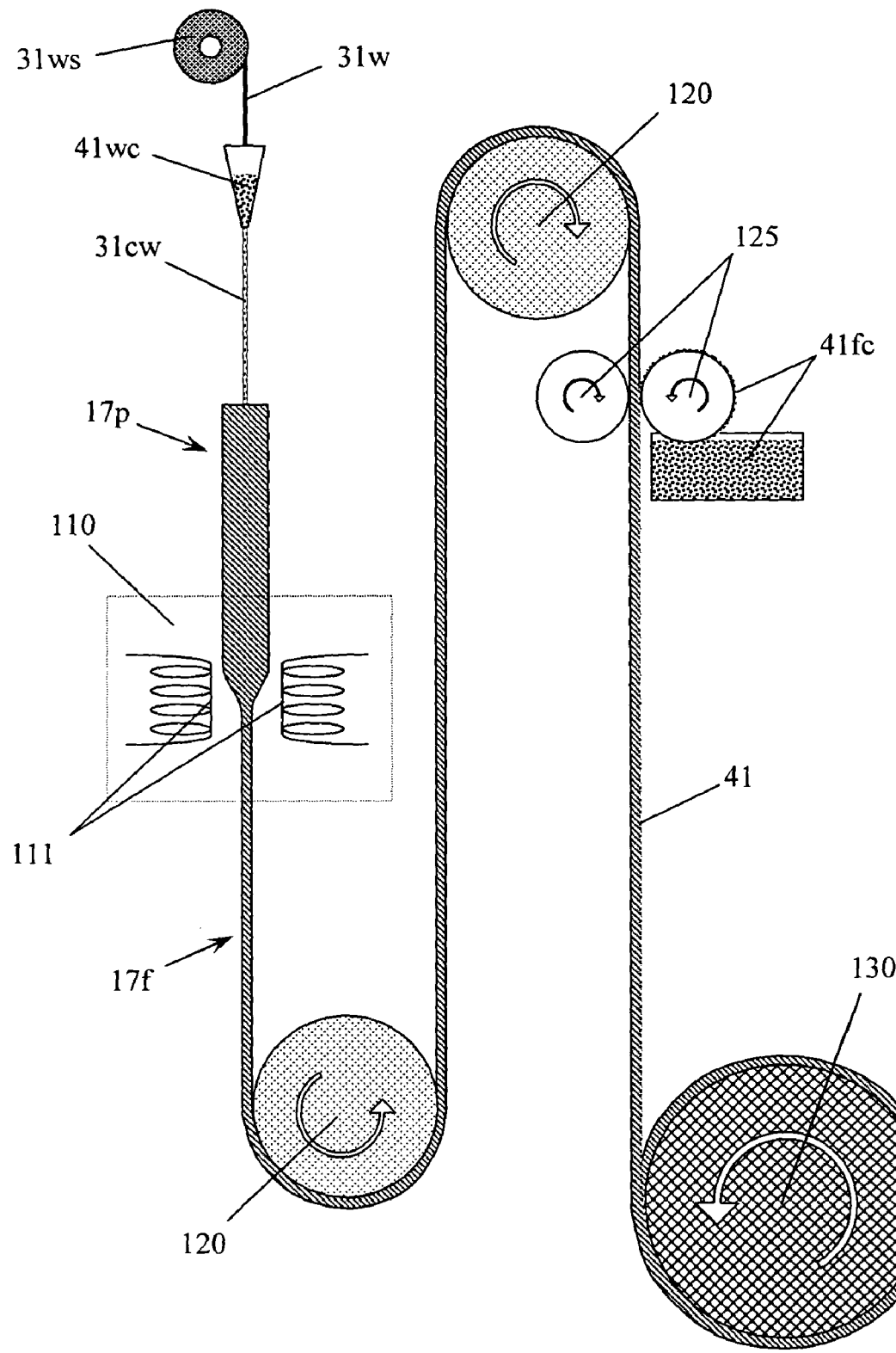
FIG. 23 schematically shows a fiber draw process to create fiber from a preform while coating the wire electrode and a surface of the fiber.

FIG. 22a depicts a preform 17p that has a carbon nanotube coating 9 that connects a center hole 31h to the surface of the fiber 17. Drawing the preform 17p into a fiber using a fiber draw process, similar to that explained below in FIG. 23, results in a fiber 17 shown in FIG. 22b. Note that the size of the preform 17p is much larger than the final fiber 17 size, as can be seen in FIG. 23. During the fiber draw process, the nanotubes 9 tend to align in the direction of the fiber draw direction, as shown in the cross-sectional view of FIG. 22b and the planar view of FIG. 22c. The amount of alignment is dependent on the fiber matrix 1 composition and the fiber draw parameters. To assist in making electrical connection between the conductive wire electrode 31 and the nanotube 9 conductive surface layer 41, the wire electrode 31 may be coated with a nanotube 9 coating during the fiber draw process. If the concentration of nanotubes 9 is high enough and the nanotubes 9 are mostly aligned in the fiber draw direction then they may also serve as a polarizer or a rubbing layer 41pr for a liquid crystal. Having the nanotubes 9 aligned in one direction tends to absorb light propagating in that direction while allowing light with an orthogonal polarization vector to pass through, hence creating polarized light. Aligning the nanotubes 9 on the surface 41pr along the length of the fiber 17 also creates a rubbing effect or locking surface for a liquid crystal layer and tends to align the liquid crystal molecules in that direction. The only concern about coating the preform with a nanotube 9 coating and then drawing it is that the required direction for the voltage to get spread from the conductive wire electrode 31 to the fiber surface 41 is orthogonal to the main orientation of the nanotube 9. However, there are enough nanotubes that are crossed to propagate the voltage down to and across the fiber 17 surface.

FIG. 23 illustrates a fiber draw process where a preform 17$p$ is fed into a furnace 110 and the heat from the heating elements 111 softens the glass or plastic preform 17$p$ enough to allow it to neck down into fiber 17$f$. In one embodiment, the fiber 17$f$ is preferably pulled from the preform 17$p$ and wound on a take-up spooler 130. A wire electrode 31 may be drawn into the fiber 17$f$ through a hole or tunnel in the preform 17$p$. The wire 31$w$ has to be threaded through the hole or tunnel in the preform 17$p$ before the preform 17$p$ is placed into the furnace 110. During the fiber draw process the wire hole or tunnel in the preform 17$p$ decreases in size as it is drawn into fiber 17$f$ and the wire 31$w$ are pulled off of the wire spool 3$ws$ through the preform 17$p$ and into the fiber 17$f$. The wire electrode 31$cw$ may be coated with a conductive coating 31$cw$ in a coating system 41$wc$ before it is drawn into the preform 17$p$. This coating 31$cw$ assists in making contact to a conductive coating 41 in the fiber 17$f$, which is used to spread the voltage across the surface of the fiber 17$f$.

Coating 41$fc$ is preferably applied 125 to the fiber 17 using one of several different techniques. The fiber 17$f$ may be drawn through a die and die coated, it may be drawn against a coated surface to coat one or more surfaces or it may be coated by any other coating process used to coat fiber.

Many different types of coating that perform different functions may be applied. In one embodiment, a conductive coating 41, such as carbon nanotubes, is applied to spread the voltage from the wire electrode 31$w$ across the surface. In another embodiment, a black absorbing coating is applied to either add a black matrix to the fiber 17$f$ or to add a black absorbing background. In yet another embodiment, a reflective coating is applied to the fiber 17$f$ to reflect light either into or out of the fiber 17$f$ or to add a reflective background. In another embodiment, a color coating is applied to add a color filter function. In still another embodiment, a rubbing layer coating is applied and aligned for a liquid crystal. Another embodiment applies a polarizer coating to build the polarizer into the fiber 17. In other embodiments, several other coatings useful for flat panel display may be applied. Several different coatings described herein may be applied to the same fiber during the fiber draw process.

Figure 24:
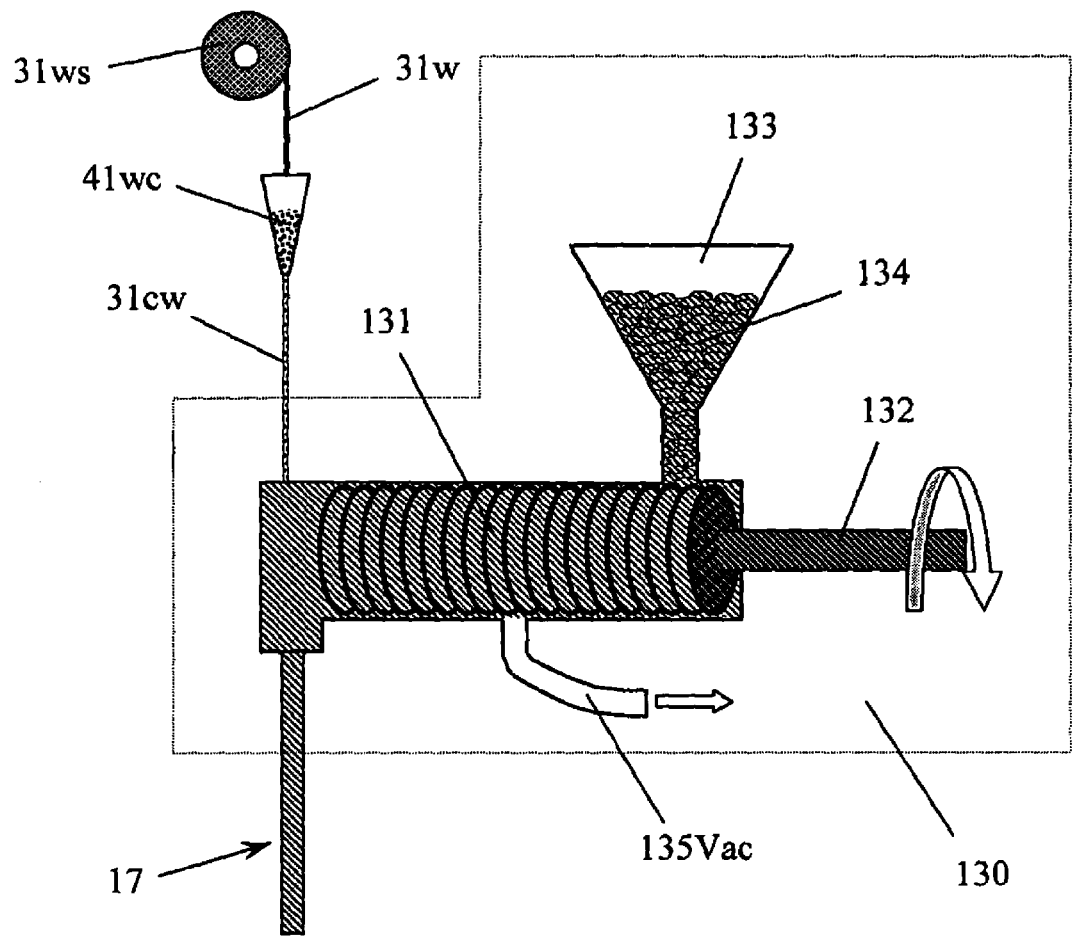
FIG. 24 schematically shows an extrusion process to create preforms or extrude the fiber directly.

FIG. 24 shows another method of forming a fiber 17$f$ for a fiber-based display. In this case, an extrusion process is used to extrude plastic or glass fiber 17. An extruder 130 is preferably used to push material 134 out of a complex-shaped die to form the desired cross-sectional shape of the fiber 17. The extruder 130 may also be used to form preforms 17$p$ for the fiber draw process explained above in FIG. 23. During the extrusion process, wire electrodes 31 are preferably directly extruded into the fibers 17. In the plastic extrusion industry this type of extruder is referred to as a cross-head extruder. A plastic extruder 130 has a hopper 133 where the plastic pellets 134 feed into a screw press 132. A vacuum 135Vac is usually applied in the screw pressing area to remove any air between the pellets 134. The screw press 132 places a high enough force on the plastic to make it flow out though the die. Heat is also applied to the extruder to lower the viscosity of the extruding material. In both the extrusion and draw process several wire electrodes may be included into the fiber 17 during the forming process and more than one line of the display may be contained in the fiber 17 and drawn or extruded at once.

Figure 25A:
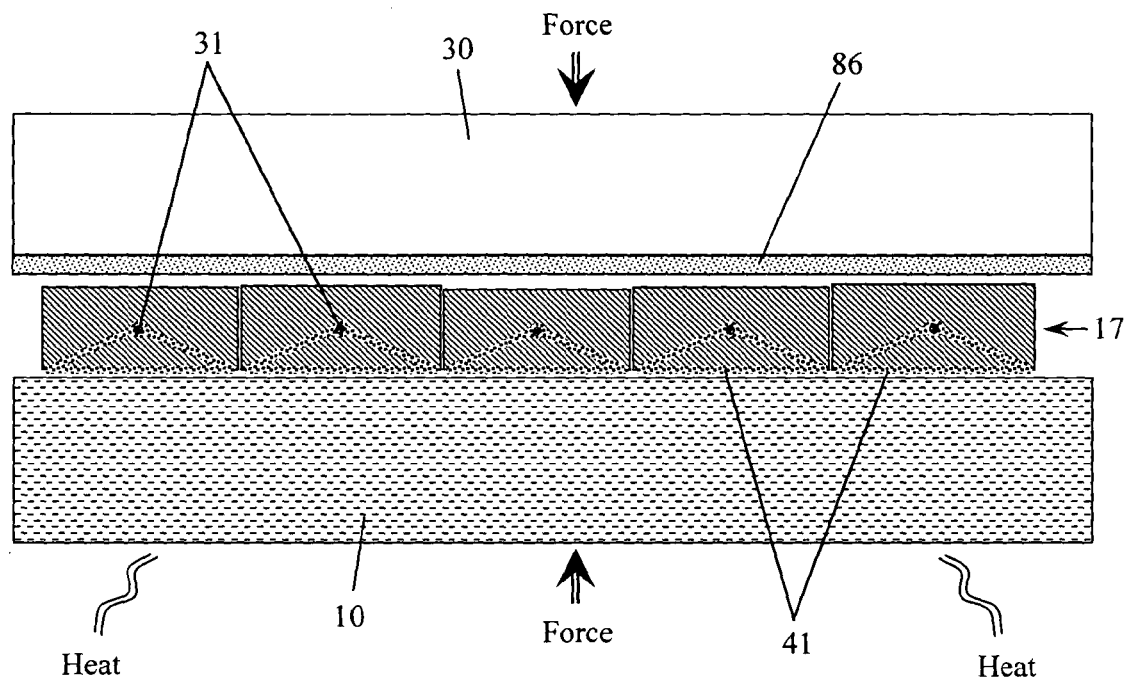
FIG. 25a schematically shows an array of fibers sandwiched between a coated substrate and a flat plate with pressure applied between the substrate and the plate and heat applied to the sandwich.
Figure 25B:
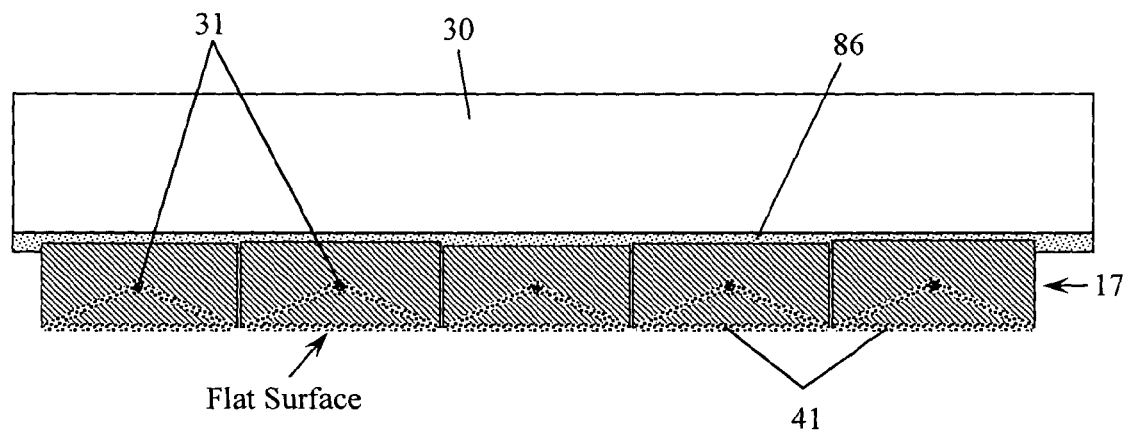
FIG. 25b schematically shows the array of fibers from the process shown in FIG. 25a where the fibers are flattened on one surface and the other surface is fused to the substrate.
Figure 26A:
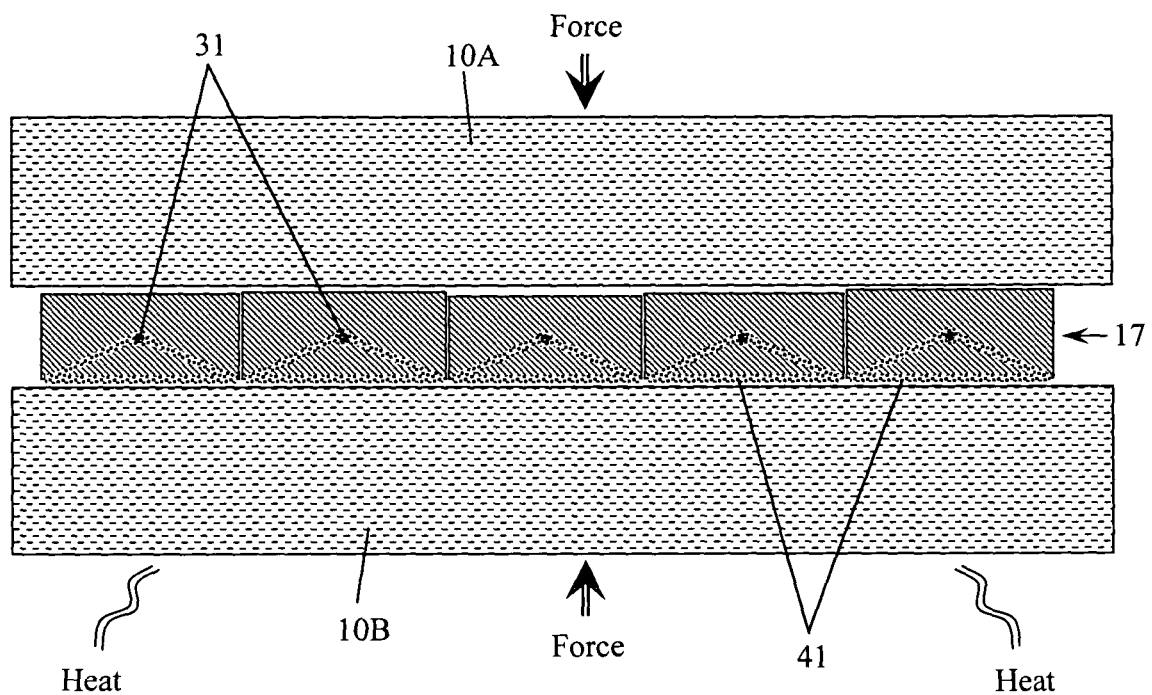
FIG. 26a schematically shows an array of fibers sandwiched between two flat plates with pressure applied to the plates and heat applied to the sandwich.
Figure 26B:
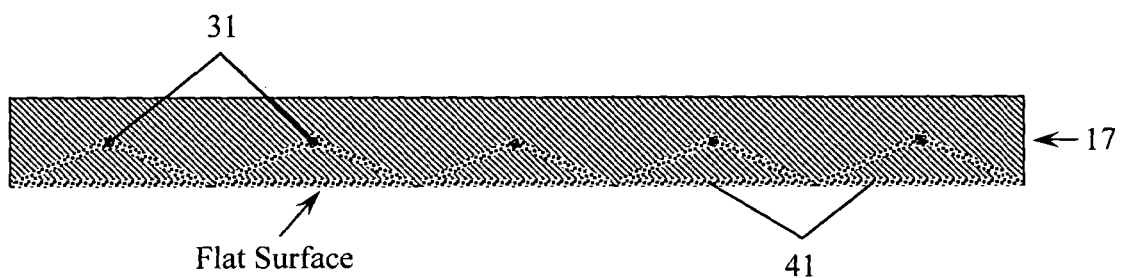
FIG. 26b schematically shows the array of fibers from the process shown in FIG. 26a where the fibers are fused together with flattened surfaces.

Forming the fiber for a fiber-based display with the correct shape, size and structure (an electrode to spread the charge across the fiber surface) is very important especially when they are used in a panel that addresses a thin electro-optic material, such as a liquid crystal. However, it is also important that the surface of the fiber array that is in contact with the thin electro-optic material is flat. FIGS. 25 and 26 show examples of how to flatten this interface and keep it flat for future processing steps. FIG. 25$a$ shows an array of fibers 17 that is sandwiched between a flat plate 10 and a substrate 30 that is coated with an adhesive layer 86. Applying a compressive force to the sandwich while adding heat causes the adhesive layer 86 to flow and connect the fibers 17 to the substrate, as shown in FIG. 25$b$. The adhesive layer 86 may be composed of many different types of polymer or silicone materials. In fact, if the correct temperature and pressure is applied to the sandwich, the fibers 17 and substrate 30 may fuse together without any adhesive layer. Using a closely index matched adhesive also removes the reflection from the interface between the fiber array 17 and the substrate 30. Also, using the correct temperature and pressure also flattens the surface of the fiber array 17 that is in contact with the flat plate 10. Adding a vacuum to the sandwich during the flattening process helps remove any air trapped in the array or the interfaces.

FIG. 26 illustrates a method of flattening and fusing the fiber 17 together in an array by sandwiching the array of fibers 17 between two flat plates 10A and 10B. By applying force, heat and a vacuum to the sandwich, the fibers 17 are softened and melted together. The surfaces that were in contact with the flat plates 10A and 10B of the final fused fiber array 17, FIG. 26$b$, are as flat and have the inverse of the surface finish of the flat plates 10A and 10B. Under the correct processing conditions (time, temperature, pressure, vacuum, cleanliness), the fibers 17 in the array fuse together without any reflection from the initial interface between the fibers. One additional benefit of flattening the surface of the fiber array 17 containing the conductive layer 41 is that the flattening process also flattens any surface structure caused by the materials used to create the conductive layer 41. For example, if highly tangled carbon nanotubes are used to create the conductive layer 41, they tend to protrude from the surface of the fiber. If this protrusion is more than about 10 percent of the electro-optic (such as a liquid crystal) thickness, it forms an observable defect in the final panel. Using the flattening process on this tangled nanotube coating pushes the tangled nanotubes into the surface of the fiber 17, hence creating a final flat surface. Tight control of the fiber 17 shape and size is also relaxed if the flattening process is used; even round fibers may be flattened if the correct processing conditions (time, temperature, pressure, vacuum) are used.

FIG. 27 illustrates how a transflective display may be assembled using fibers 17 with a transparent conductive coating 41 connected to wire electrodes 31 as discussed above. A transflective display is one that operates in both transmissive and reflective modes. The top of the display illustrated in FIG. 27$a$ operates in a transmissive mode where the fiber arrays 17$a$, 17$b$, 17$c$, 17$d$ and (17R, 17G and 17B) are sandwiched around liquid crystal layers 37R, 37G, 37B and 37Y that may be modulated between clear and reflecting red, green, blue and yellow, respectively. There are two presently known liquid crystal molecules that can be modulated from a transparent to a reflective color state. The cholesteric liquid crystal molecule developed by Kent Displays Incorporated (Kent, Ohio) is the most well known, but the Smectic-A liquid crystal being developed by PolyDisplay (Sandefjord, Norway) also operates in these electro-optic color states. The structure in this half of the display requires that the liquid crystal materials 37R, 37G, 37B and 37Y have a voltage threshold, so they can be passively addressed. Passive addressing limits the update speed or frame rate of the display to the electro-optic response time of the liquid crystal times the number of lines in the display. If the liquid crystal modulation time is 25 msec and there are 1,000 lines in the display, then the display takes 25 seconds to update the image. The bottom of the display, operated in a transmissive mode, may be operated at video rates if a plasma-addressing scheme is used and the correct liquid crystal layer 37F is chosen. These liquid crystal layers 37F are the primary modulation layers used in most liquid crystal displays and traditionally gate light from a transparent state to an absorbing state. However, the liquid crystal layers 37F traditionally require other layers around the liquid crystal layer 37F, like polarizers. Since the plasma-addressing scheme using the plasma tubes 27 and the bottom electrodes 31 and 41 in the fiber array (17R, 17G and 17B) plates out charge in the tubes 27 throughout the display at video rates the liquid crystal layer 37F simply reacts to this plated out charge and does not require a threshold voltage. In order for the bottom of the panel to operate as a transmissive display, it has to be backlit 102. The panel illustrated in FIG. 27a may be divided into its separate halves and either a reflective display or a transmissive display may be fabricated. In addition, the yellow liquid crystal layer 37 is only added to increase the reflective color purity of the display.

Figure 27A:
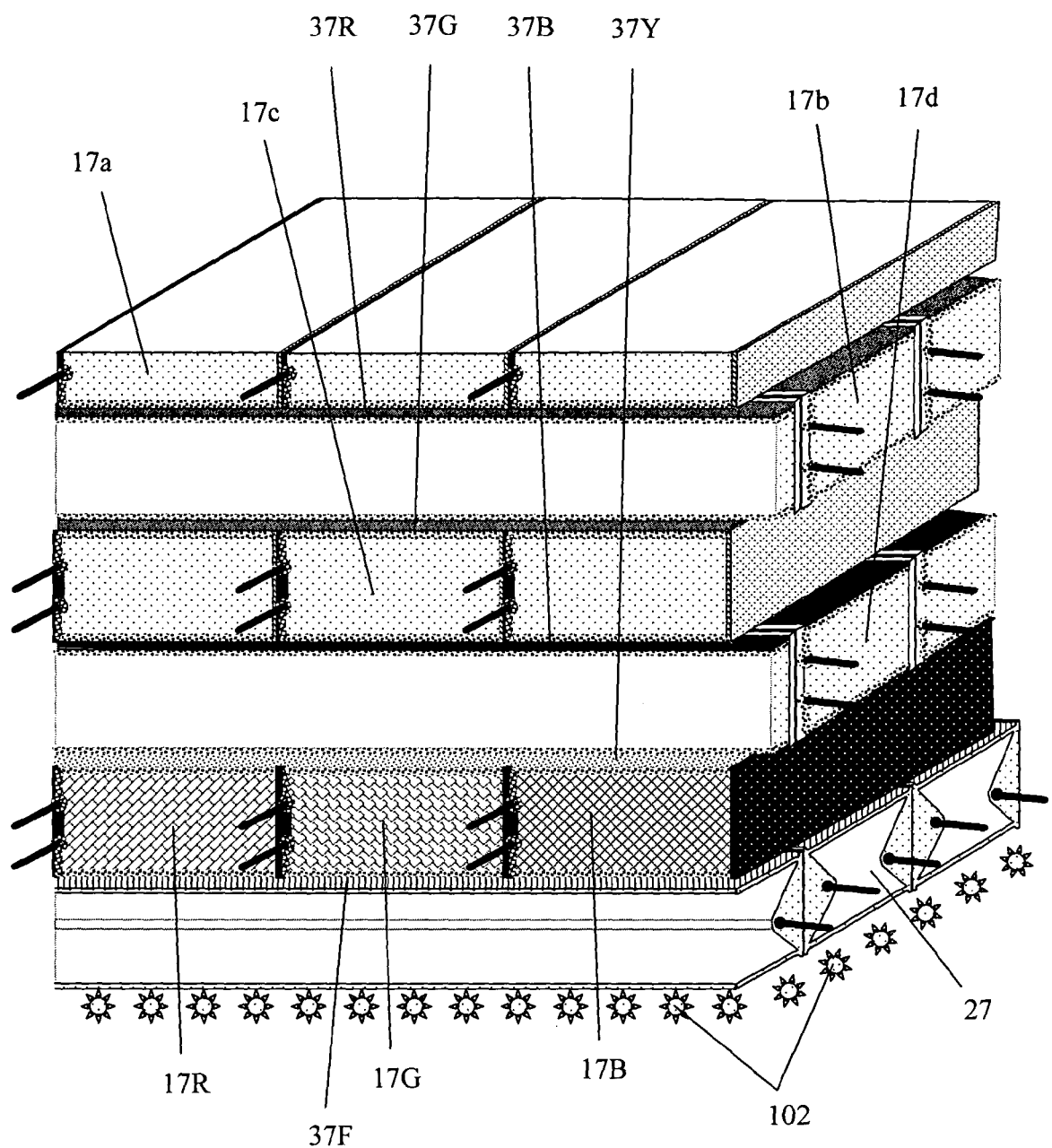
FIG. 27a illustrates a fiber based display that is composed of a top section that serves as a reflective display and a bottom section that serves as a transmissive display.
Figure 27B:
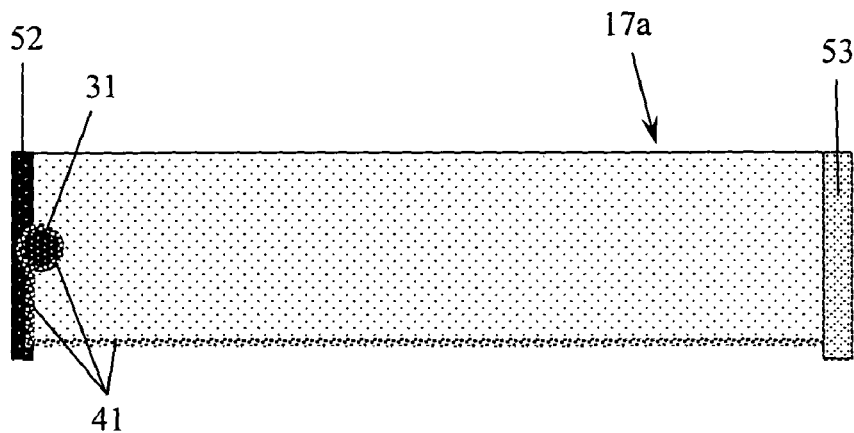
Figure 27C:
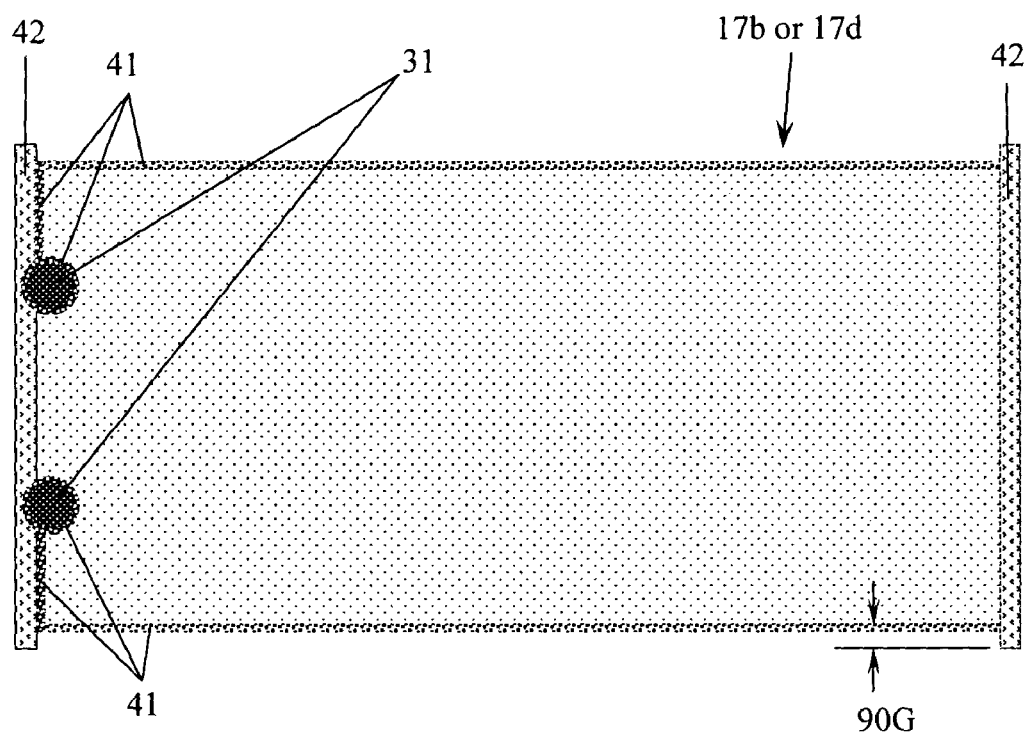
Figure 27D:
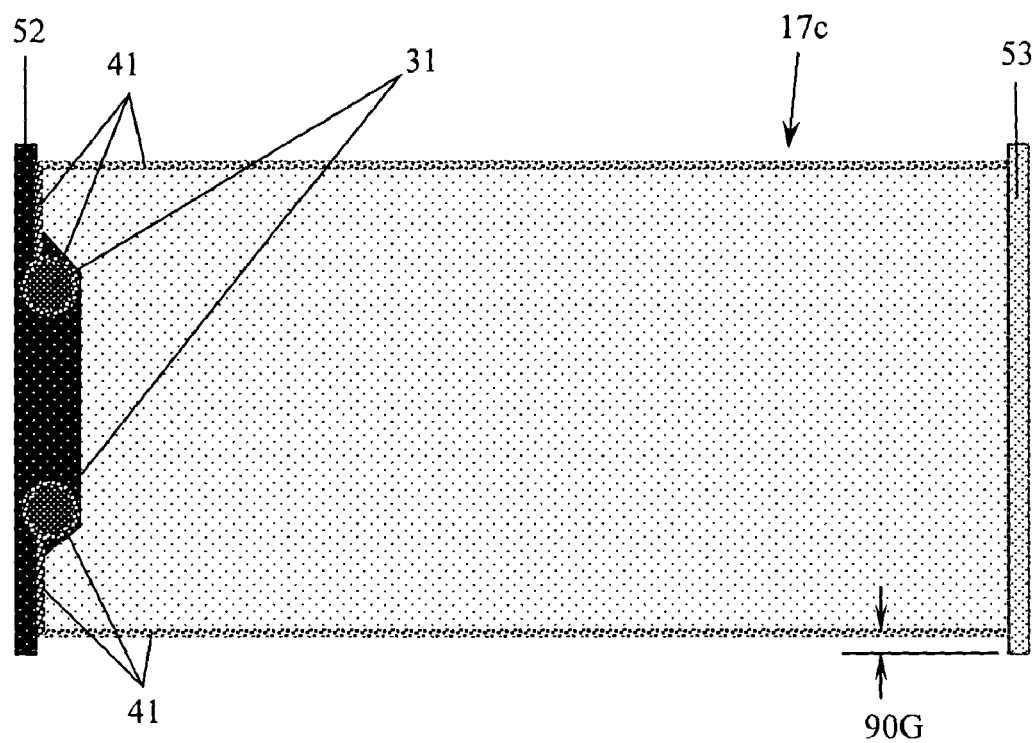
Figure 27E:
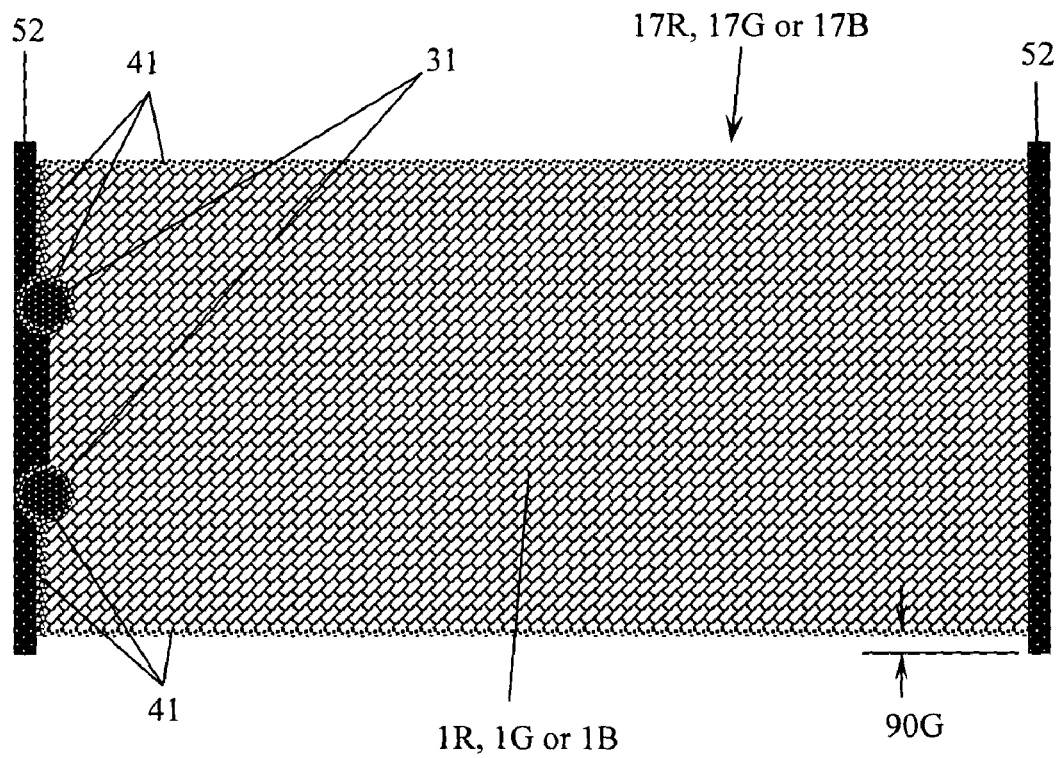

FIGS. 27b through 27e show cross-sections of the fibers 17a, 17b, 17c, 17d and (17R, 17G or 17B) in the display in FIG. 27a. FIG. 27b shows the top fiber 17a in FIG. 27a. This fiber 17a only has a transparent conductive layer 41 on the surface in contact with the red liquid crystal layer 37R. The transparent conductive layer 41 is used to spread the voltage across the surface of the fiber 17a and is electrically connected to a wire electrode 31 used to carry the majority of the current. The fiber 17a has a black absorbing layer 52 on one side and a white reflecting layer 53 on the other side to serve as a visor, as discussed below in FIG. 28. FIG. 27c represents the fibers 17b and 17d in FIG. 27a. In this case, the fibers 17b and 17d have individual transparent conductive coatings 41 connected to separate wire electrodes 31 on both the top and bottom of the fiber 17b or 17d, so the liquid crystals 37G, 37B and 37Y in contact with the surfaces may be independently addressed. Depending on the addressing scheme of the passive addressing part of the display, the two electrodes 31 may be combined together as one. The fibers 17b and 17d also have a dielectric isolation layer 42 on the sides of the fiber 17b and 17d to both electrically isolate them and to remove the reflection from between the fibers 17b and 17d when arrayed. FIG. 27d is a cross-section of the fiber 17c in FIG. 27a and is very similar to fiber 17a except it has independent wire 31 and charge spreading 41 electrodes on the top and bottom surfaces to independently address the green 37G and blue 37B liquid crystal layers on those surfaces. FIG. 27e is a cross-section of the bottom fiber array (17R, 17G or 17B) in FIG. 27a. These fibers 17R, 17G or 17B are preferably composed of a red, green or blue material, respectively, to add a color filter to the display when the fibers 17R, 17G and 17B are arrayed. The wire 31 and charge spreading 41 electrode on the top of the fiber is used to address the yellow liquid crystal layer 37Y in the top passive addressed panel and the bottom wire 31 and charge spreading 41 electrode is used to set the charge in the plasma tubes 27 and act as a ground plane for that charge to address the fast liquid crystal layer 37F in the transmissive half of the display. The sides of the fibers 17R, 17G and 17B are composed of a black absorbing material 52 to add a black matrix function to the display. The top wire 31 and charge spreading 41 electrode on the fiber 17R, 17B and 17G are not required if the fiber 17R, 17B and 17G is only used for a transmissive display.

Figure 28A:
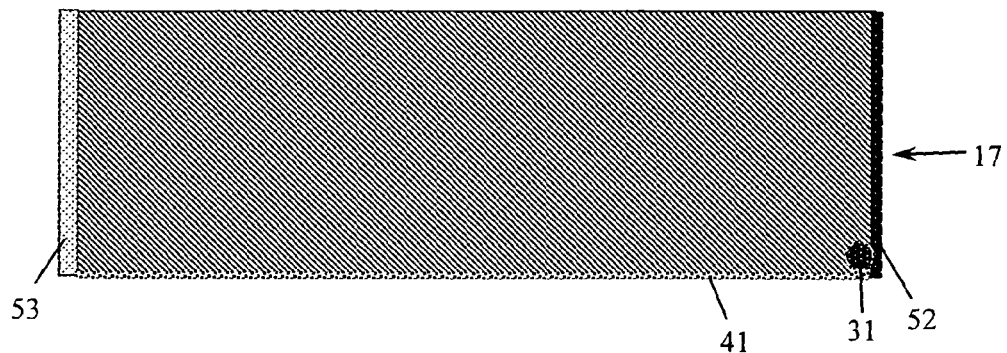
FIG. 28a schematically shows a cross-section of a fiber with a dark absorbing side and a reflecting side.
Figure 28B:
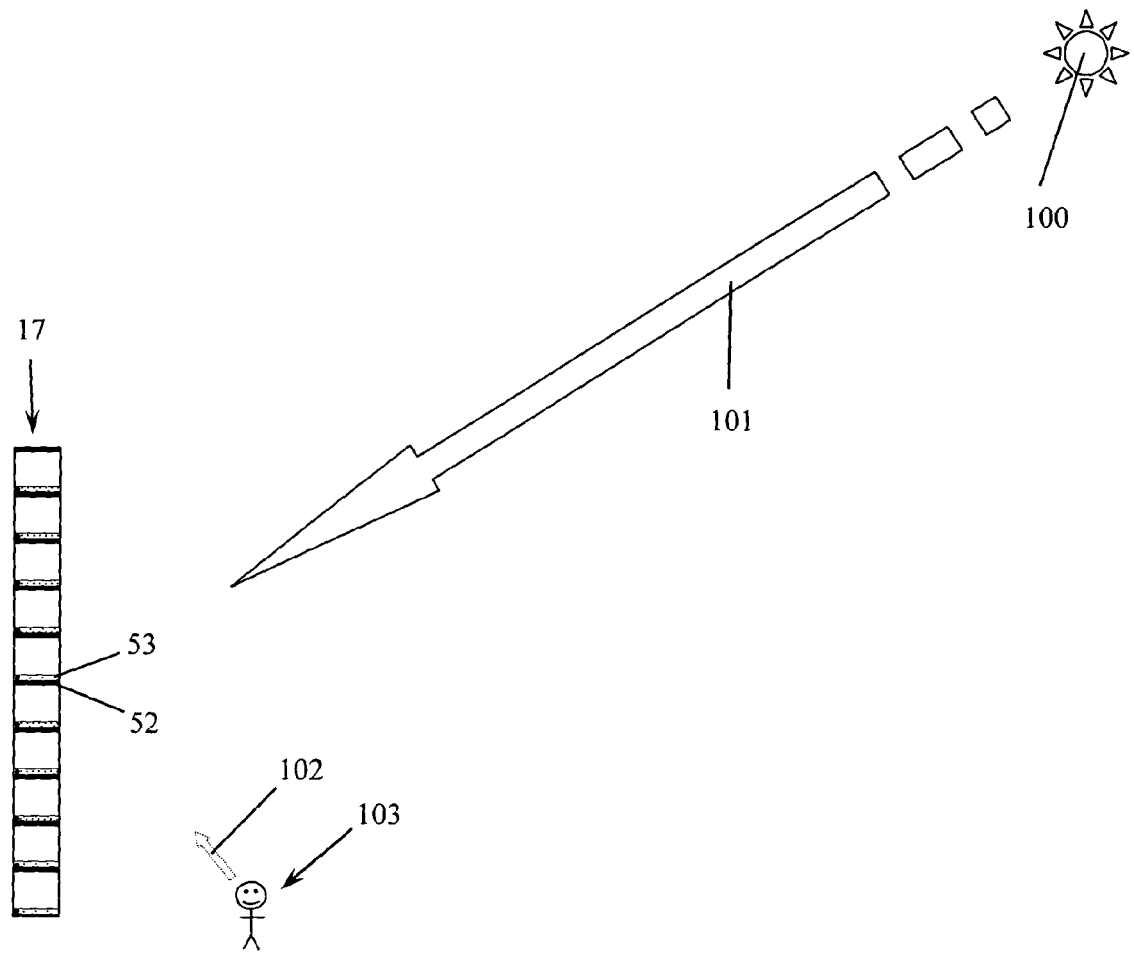
FIG. 28b illustrates an array of fibers in FIG. 28a illuminated with sun light.

FIG. 28 shows another embodiment of the invention where a black absorbing coating 52 is added to the side of the fiber 17 to act as a visor during outdoor applications to block the sunlight 101 shining into the panel from the sun 100. This sun blocking visor 52 also works best for outdoor displays that use phosphorescent materials to generate light, like plasma displays and field emission displays, since these materials are highly reflective in sunlight 101. This visor methodology is used in the Light Emitting Diode (LED) industry for outdoor electronic signs and is also used in traffic lights to remove the light reflecting on the light bulbs. However, in the traditional flat panel industry where the structure is built-up on the panel, it is difficult to achieve depth or height of an absorbing layer required to shadow the pixel from the sun 100. Using a light blocking visor structure 52 similar to that shown in FIG. 28a requires a fiber height, $h=pw/\tan(\alpha)$, where pw is the width of the pixel and $\alpha$ is the angle of the sun with respect to the horizon. If a display has a pixel pitch of 1 mm and the sun is very low on the horizon (30 degrees) then the height of the fiber has to be 1.73 mm to block all the sun shining into the display. However, if a fiber 17 is designed to block light as low as 30 degrees then the viewing angle from below is also 30 degrees and a greater percentage of the emitted or reflected light gets blocked as the viewer moves off the vertical axis of the display. FIG. 28 also shows adding a reflective layer 53 to the other side of the fiber 17. If the fibers 17 are arrayed in a panel similar to that shown in FIG. 28b then sunlight 101 shining on the fiber array 17 from above the normal of the display gets reflected into the panel enhancing the amount of light incident on the reflective electro-optic material 37. However, a viewer 103 standing below the normal of the panel will observe 102 the black absorbing 52 part of the fiber 17, which increases the contrast of the display.

Figure 29:
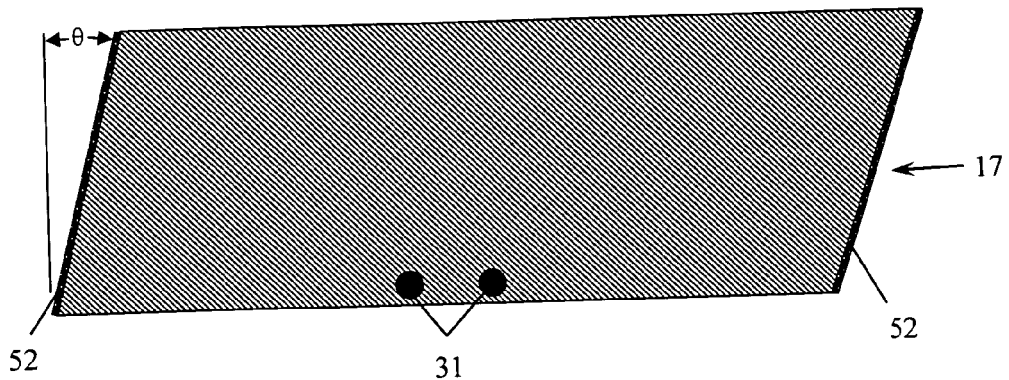
FIG. 29 schematically shows a cross-section of a skewed top fiber with dark absorbing sides.
Figure 30A:
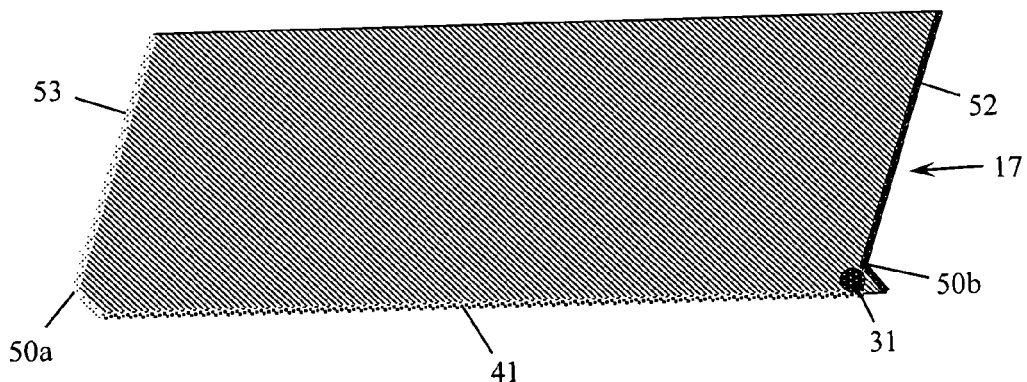
FIG. 30a schematically shows a cross-section of a skewed top fiber with interlocking sides with one reflective side and one absorbing side.
Figure 30B:
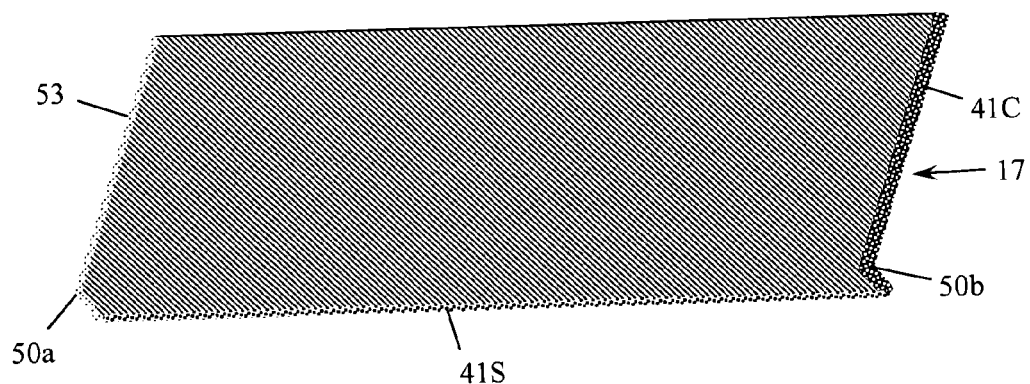
FIG. 30b schematically shows a cross-section of a skewed top fiber in FIG. 30a where the wire electrode is replaced with a conductive material built into the fiber.

FIG. 29 shows a method of adding a slanted surface to the sun blocking visor 52 of the top fiber 17. Slanting the sides of the fiber 17 by an angle $\theta$ reduces the thickness of the fiber 17 required to block the light 101 from the sun 100 and increases the brightness of the display when viewed 102 from below the normal of the display. When fabricating a display with this type of slanted fiber 17, the fibers 17 when arrayed tend to slide up on top of each other when a force is applied to the fiber 17 array to tighten the fiber 17 array. FIG. 30a shows a method of adding an interlocking mechanism 50a and 50b to the sides of the fibers 17 to keep them locked in the same plane when arrayed and tightened. This interlocking fiber 17 is created with a reflective layer 53 on one side and a black absorbing visor layer 52 on the other. A transparent conductive layer 41 is used to spread the voltage from a connected wire electrode 31 across the surface of the fiber 17. FIG. 30b shows that the wire electrode may be replaced with a highly conductive layer 41C on the side of the fiber 17.

As is obvious from the above examples there are several different methods of using a conductive coating on a wire containing fiber or tube or attached to a wire in a fiber to spread the charge across its surface. The above figures are only used as an example and are not intended to limit the scope of using a conductive coating on a surface to spread charge across the surface. In some preferred embodiments, the conductive coating covers at least 75 percent of a width of the fiber surface in contact with the electro-optic material.

Figure 31A:
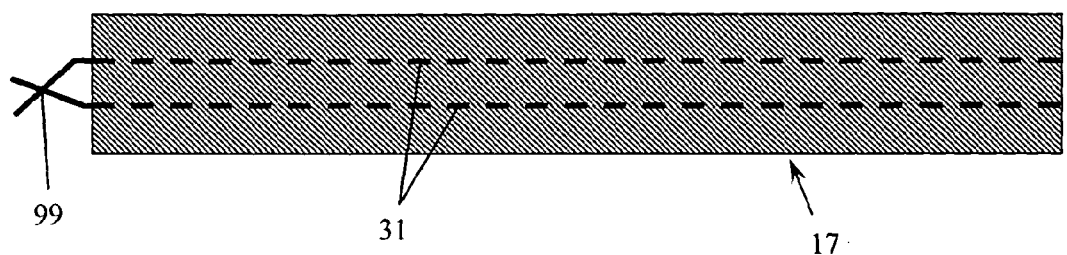
FIG. 31a schematically illustrates a single transparent fiber containing wire electrodes.
Figure 31B:
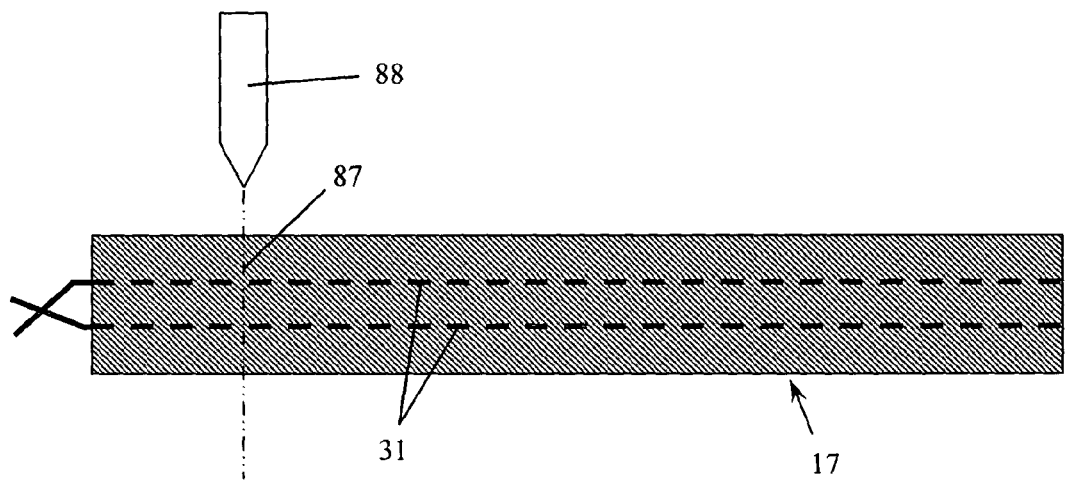
FIG. 31b schematically illustrates the fiber in FIG. 31a with a laser scanning through the fiber or tube to cut the wire electrode.
Figure 31C:
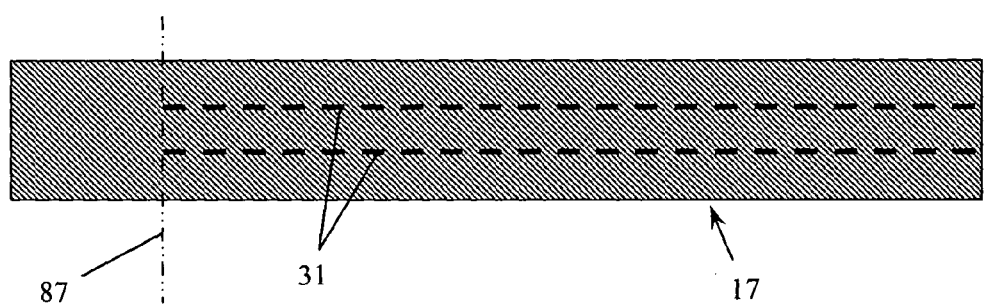
FIG. 31c schematically illustrates the fiber in FIG. 31b with the wire electrodes removed from the fiber or tube after laser cut.

FIG. 31 shows another embodiment of the invention where the wires are cut off inside the fiber or tube and pulled out of the end of the fiber or tube. FIG. 31a shows an example of a fiber 17 with wire electrodes 31 drawn into the fiber. During the fiber draw process, wires 31 are drawn through holes or tunnels designed into the preform. The wire 31 is drawn from spools above the preform. The fiber 17 is only drawn down to a size that makes the wire electrodes 31 taut in the fiber wire guides. Therefore, if the end of the fiber 17 is broken it can be pulled off of the wire electrodes 31. One issue with assembling these fibers 17 is that the wires 31 from one end of the fibers or tubes are connected directly to the circuit board, but the other end is cut off. If care is not taken during the process step of cutting off the non-connected end of the wire electrodes 31, they will cross or touch 99 and short. This short can cause entire lines in the display to be mis-addressed or an arc can occur and blow the driver chips. One method of keeping these wires 31 uncrossed is to cut them off inside the fiber or tubes. One way to cut the wires 31 off is shown in FIG. 31b, where a laser 88 is used to cut the wire electrodes 31 inside the fiber 17. Since most glass fibers or tubes used in creating the structure in a fiber-based display are transparent, the laser beam 87 is simply transmitted through the glass and only cuts the wire electrode 31. Once the wires 31 are cut off they can simply be pulled out, as shown in FIG. 31c.

Figure 32:
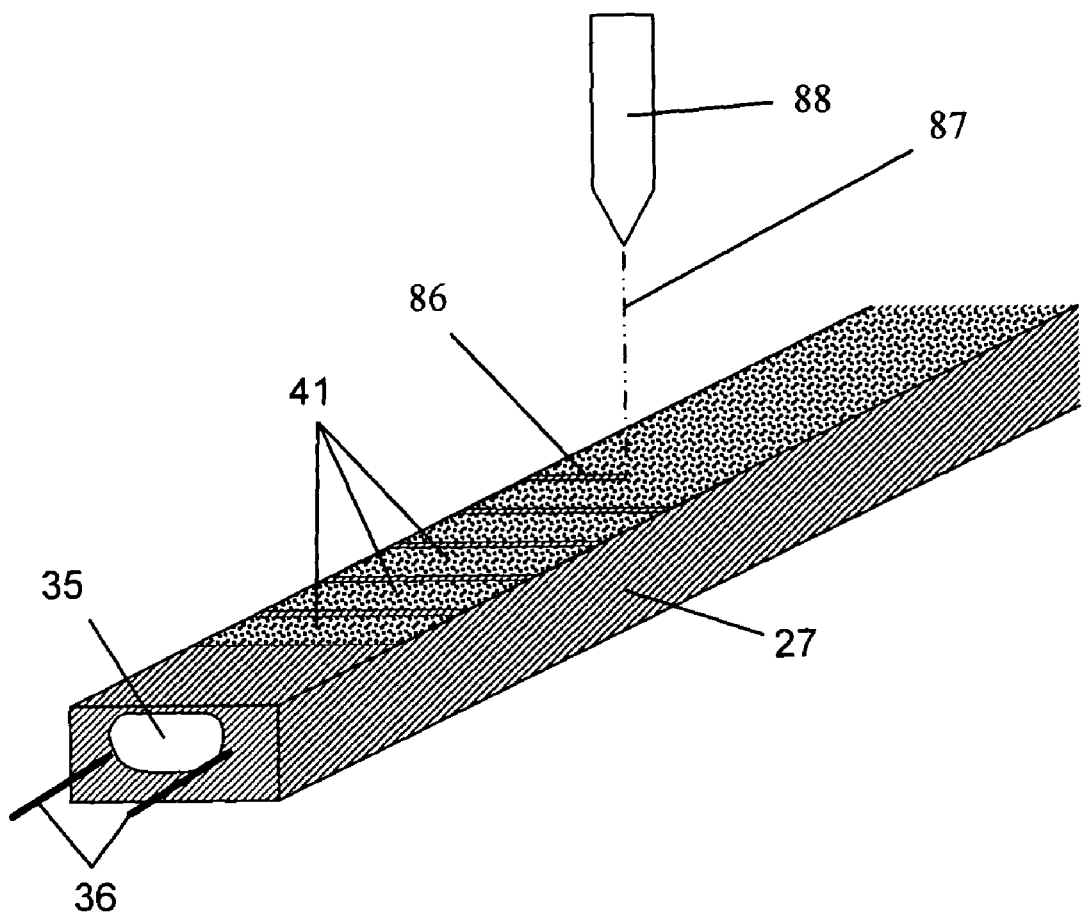
FIG. 32 schematically illustrates a tube that is coated with a conductive layer where a laser is scanning across the tube surface to separate the conductive layer into patches along the length of the tube.

FIG. 32 shows another method of using a laser 88 to scribe 86 the conductive coating 41 on the surface of a plasma tube 27 into patches using the laser beam 87. These conductive patches 41 may be used to spread the charge plated out inside the plasma tubes 35 across the surface of the tube 27. The laser 88 may also be used to electrically isolate adjacent fibers or tubes during an assemble process if there is a defect and they are electrically connected. The laser may also be used to remove the polymer from the wire electrode if the fiber is mainly composed of a polymeric material.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. An electronic display comprising:
    a) at least one fiber to form structure within the display;
    b) at least one first conductive material within the fiber to carry a majority of the current along a length of the fiber; and
    c) a first conductive coating electrically or resistively connected to the first conductive material to spread a charge from the first conductive material across the fiber, wherein at least a portion of the first conductive coating is contained within the fiber.

2. The electronic display of claim 1, wherein the first conductive material is a first wire electrode.

3. The electronic display of claim 2, wherein the fiber comprises a black absorbing layer around the wire electrode to remove a reflection from the conducting material.

4. The electronic display of claim 1, wherein the display further comprises an electro-optic material.

5. The electronic display of claim 4, wherein the first conductive coating covers at least 75 percent of a width of the fiber surface in contact with the electro-optic material.

6. The electronic display of claim 1, wherein the first conductive coating is transparent.

7. The electronic display of claim 1, wherein the first conductive coating comprises at least one carbon nanotube.

8. The electronic display of claim 1, wherein the first conductive coating comprises a conductive polymer.

9. The electronic display of claim 1, wherein the first conductive coating is applied to two or more adjacent fiber surfaces.

10. The electronic display of claim 1, wherein the first conductive coating is applied during a fiber draw process.

11. The electronic display of claim 1, wherein the first conductive coating is applied to a preform before it is drawn into the fiber.

12. The electronic display of claim 1, wherein the first conductive coating is applied during an extrusion process.

13. The electronic display of claim 1, wherein the first conductive coating is applied to the fiber after an extrusion process.

14. The electronic display of claim 1, further comprising an insulative material on at least one side of the fiber to isolate the first conductive coating from the side of the fiber.

15. The electronic display of claim 14, wherein the insulative material is clear and removes a reflection between adjacent fibers arrayed to form structure in the display.

16. The electronic display of claim 1, further comprising an index matching material on a surface of the fiber to remove a reflection from an interface between the fiber and a substrate used to fabricate the display.

17. The electronic display of claim 1, wherein the fiber comprises at least one leg that forms a gap when the fiber is placed against a surface.

18. The electronic display of claim 17, wherein the first conductive coating is disconnected at a top of the leg.

19. The electronic display of claim 1, wherein the fiber comprises at least one to shadow a first surface of the fiber from a second adjacent surface of the fiber.

20. The electronic display of claim 1, wherein the fiber comprises a black absorbing layer that performs a black matrix function.

21. The electronic display of claim 1, wherein the fiber comprises a colorant acting as a color filter.

22. The electronic display of claim 1, wherein the first conductive coating serves as a rubbing layer for a liquid crystal material.

23. The electronic display of claim 1, wherein the first conductive coating polarizes light propagating through the fiber.

24. The electronic display of claim 1, further comprising a second conductive material and a second conductive coating where the second conductive material and the second conductive coating are electrically isolated from the first conductive material and the first conductive coating.

25. The electronic display of claim 1, wherein a surface of at least one fiber is flattened by pressing the fiber against a flat plate.

26. The electronic display of claim 25, wherein the fiber is attached to a substrate.

27. The electronic display of claim 26, wherein reflection at an interface between the fibers in the fiber array and the substrate is reduced.

28. The electronic display of claim 25, wherein the fibers comprise a plurality of fibers fused together in a fiber array.

29. The electronic display of claim 1, further comprising a material in the fiber cut using a laser.

30. The electronic display of claim 29, wherein the material being cut is selected from the group consisting of a wire electrode, a conductive layer and part of a bulk material composing the fiber.

31. A display comprising:
    a) at least one fiber to form structure within the display; and
    b) an absorbing coating on at least part of a side of the fiber to act as a visor;
    wherein the display is an electronic display.

32. The electronic display of claim 31, further comprising at least one wire electrode within the fiber.

33. The electronic display of claim 31, wherein the sides of the fiber are slanted to enhance a brightness of emitted light below normal of the display.

34. The electronic display of claim 31, further comprising a reflective coating on at least part of a side of the fiber to increase an amount of light traveling through the fiber.

* * * * *

UNITED STATES PATENT AND TRADEMARK OFFICE
CERTIFICATE OF CORRECTION

PATENT NO.      : 7,777,928 B2
APPLICATION NO. : 11/236904
DATED           : August 17, 2010
INVENTOR(S)     : Chad Byron Moore Page 1 of 1

It is certified that error appears in the above-identified patent and that said Letters Patent is hereby corrected as shown below:

Column 16, line 27: replace "one" with "one recess"

Signed and Sealed this
Eighth Day of May, 2012

David J. Kappos
*Director of the United States Patent and Trademark Office*